(12) United States Patent
McCullough et al.

(10) Patent No.: US 10,395,186 B1
(45) Date of Patent: Aug. 27, 2019

(54) GRAPHICAL USER INTERFACE FOR A RESTAURANT MANAGEMENT SYSTEM INCLUDING A STATUS INDICATOR

(75) Inventors: Charles Norman McCullough, Oakland, CA (US); Elizabeth Suzanne Casey, Orinda, CA (US); Paul John Higgins, Oakland, CA (US); John Francis Donohoe, Oakland, CA (US)

(73) Assignee: OpenTable, Inc., San Francisco, CA (US)

( * ) Notice: Subject to any disclaimer, the term of this patent is extended or adjusted under 35 U.S.C. 154(b) by 0 days.

(21) Appl. No.: 13/463,405

(22) Filed: May 3, 2012

Related U.S. Application Data

(60) Provisional application No. 61/488,677, filed on May 20, 2011.

(51) Int. Cl.
| | |
|---|---|
| *G06Q 30/06* | (2012.01) |
| *G06Q 10/02* | (2012.01) |
| *H04L 29/08* | (2006.01) |
| *G06Q 10/06* | (2012.01) |

(52) U.S. Cl.
CPC ........... *G06Q 10/025* (2013.01); *G06Q 10/02* (2013.01); *G06Q 10/06* (2013.01); *H04L 67/04* (2013.01); *H04L 67/306* (2013.01)

(58) Field of Classification Search
CPC ......... G06Q 10/02; H04L 67/04; H04L 67/22; H04L 67/306; H04L 69/329
USPC .............. 705/5, 14.27, 14.58, 7.11; 709/206; 370/352, 409, 370; 463/25; 707/999.01; 715/206
See application file for complete search history.

(56) References Cited

U.S. PATENT DOCUMENTS

| | | | | |
|---|---|---|---|---|
| 4,222,111 | A * | 9/1980 | Sloan ..................... | G08B 5/221 340/286.09 |
| 5,272,474 | A * | 12/1993 | Hilliard ........................ | 340/4.61 |
| 5,839,115 | A | 11/1998 | Coleman | |
| 5,850,214 | A * | 12/1998 | McNally et al. ............. | 345/173 |
| 6,088,681 | A * | 7/2000 | Coleman et al. .............. | 705/15 |
| 6,816,085 | B1 | 11/2004 | Haynes et al. | |
| 7,386,469 | B1 | 6/2008 | Shida | |
| 7,430,411 | B2 | 9/2008 | Sengupta et al. | |

(Continued)

FOREIGN PATENT DOCUMENTS

| | | |
|---|---|---|
| JP | H064777 | 1/1994 |
| JP | 11242697 | 7/1999 |

(Continued)

OTHER PUBLICATIONS (1 of 11) iMagic Restaurant Reservation webpages—Home page <http://www.imagicrestaurantsoftware.com/> (<http://web.archive.org/web/20100414035323/http://www.imagicrestaurantsoftware.com/> on Oct. 14, 2010).

(Continued)

*Primary Examiner* — Akiba K Allen
(74) *Attorney, Agent, or Firm* — Banner & Witcoff, Ltd.

(57) ABSTRACT

A system for managing a restaurant comprises a restaurant server including a graphical user interface. The graphical user interface comprises a display and an input interface. The display displays reservation information for the restaurant. The reservation information includes a colored indicator of a status. The input interface receives an indication to display the reservation information for the restaurant.

26 Claims, 48 Drawing Sheets

(56) References Cited

U.S. PATENT DOCUMENTS

| | | |
|---|---|---|
| 8,041,605 B1 | 10/2011 | Harrity |
| 2002/0002502 A1 | 1/2002 | Maes et al. |
| 2002/0095312 A1 | 7/2002 | Wheat |
| 2002/0116249 A1 | 8/2002 | Ellinger |
| 2003/0083919 A1 | 5/2003 | Hammann |
| 2003/0097283 A1 | 5/2003 | Kimura et al. |
| 2004/0138929 A1 | 7/2004 | Awiszus et al. |
| 2005/0030162 A1 | 2/2005 | Stambaugh |
| 2005/0080675 A1 | 4/2005 | Lovegreen et al. |
| 2007/0136110 A1 | 6/2007 | Presley |
| 2007/0143157 A1 | 6/2007 | Sussman et al. |
| 2007/0173331 A1 | 7/2007 | Crawford et al. |
| 2007/0250355 A1 | 10/2007 | Leet et al. |
| 2008/0059254 A1 | 3/2008 | Vivadelli et al. |
| 2008/0173717 A1 | 7/2008 | Antebi et al. |
| 2008/0249813 A1 | 10/2008 | Schmeyer |
| 2008/0270230 A1 | 10/2008 | Hendrickson et al. |
| 2009/0030745 A1 | 1/2009 | Ikezawa |
| 2009/0063351 A1 | 3/2009 | Schmeyer et al. |
| 2009/0158328 A1 | 6/2009 | Huysegems et al. |
| 2009/0292566 A1 | 11/2009 | Bossert |
| 2010/0161402 A1 | 6/2010 | Reyna |
| 2011/0029465 A1 | 2/2011 | Ito et al. |
| 2011/0047028 A1 | 2/2011 | Kim et al. |
| 2011/0218867 A1 | 9/2011 | Cerrato |
| 2011/0246247 A1* | 10/2011 | McCullough et al. ............ 705/5 |
| 2011/0307392 A1 | 12/2011 | Jenson |
| 2011/0314417 A1 | 12/2011 | Allen |
| 2012/0022900 A1 | 1/2012 | Thakkar |
| 2013/0097038 A1* | 4/2013 | Potter et al. .................... 705/21 |
| 2016/0063863 A1* | 3/2016 | Stefik .................... G06Q 10/02 340/932.2 |

FOREIGN PATENT DOCUMENTS

| | | |
|---|---|---|
| JP | 2001265869 | 9/2001 |
| JP | 2002-230129 | 8/2002 |
| JP | 2003076902 | 3/2003 |
| JP | 2004118659 | 4/2004 |
| JP | 2006244184 | 9/2006 |
| JP | 2006260144 | 9/2006 |
| JP | 2006338075 | 12/2006 |
| JP | 2007058800 | 3/2007 |
| JP | 2007316781 | 12/2007 |
| JP | 2010055360 | 3/2010 |

OTHER PUBLICATIONS (2 of 11) iMagic Restaurant Reservation webpages—System Requirements page <http://www.imagicrestaurantsoftware.com/RestaurantRequirements.php> (<http://web.archive.org/web/20100311072128/http://www.imagicrestaurantsoftware.com/RestaurantRequirements.php> on Mar. 11, 2010).

(3 of 11) iMagic Restaurant Reservation webpages—Download page <http://www.imagicrestaurantsoftware.com/RestaurantDownload.php>(<http://web.archive.org/web/20100330002117/http://www.imagicrestaurantsoftware.com/RestaurantDownload.php> on Mar. 30, 2010).

(4 of 11) iMagic Restaurant Reservation webpages—Online Manual: Tutorial 2 Taking Reservations page <http://www.imagicrestaurantsoftware.com/RestaurantManual3.php> (<http://web.archive.org/web/20100305132625/http://www.imagicrestaurantsoftware.com/RestaurantManual3.php> on Mar. 5, 2010).

(5 of 11) iMagic Restaurant Reservation webpages—Online Manual: Tutorial 3 Viewing Reservations Page <http://www.imagicrestaurantsoftware.com/RestaurantManual4.php> (<http://web.archive.org/web/20081029234256/http://www.imagicrestaurantsoftware.com/RestaurantManual4.php> on Oct. 29, 2008).

(6 of 11) iMagic Restaurant Reservation webpages—Online Manual: Tips and Tricks—Quickly Finding Reservations Page <http://www.imagicrestaurantsoftware.com/RestaurantManual7.php> (<http://web.archive.org/web/20080910213648/http://www.imagicrestaurantsoftware.com/RestaurantManual7.php> on Sep. 10, 2008).

(7 of 11) iMagic Restaurant Reservation webpages—Online Manual: Using Table Blocks Page <http://www.imagicrestaurantsoftware.com/RestaurantManual13.php> (<http://web.archive.org/web/20080910213632/http://www.imagicrestaurantsoftware.com/RestaurantManual13.php> on Sep. 10, 2008).

(8 of 11) iMagic Restaurant Reservation webpages—Online Manual: Using the Visual Layout Page <http://www.imagicrestaurantsoftware.com/RestaurantManual15.php> (<http://web.archive.org/web/20100304230140/http://www.imagicrestaurantsoftware.com/RestaurantManual15.php > on Mar. 4, 2010).

(9 of 11) iMagic Restaurant Reservation webpages—iMagic Restaurant 4.2 Screenshots Page <http://softpedia.com/progScreenshots/iMagic-Restaurant-Reservation-Screenshot -1638.html> (<http://web.archive.org/web/20090217122051/http://softpedia.com/progScreenshots/iMagic-Restaurant-Reservation-Screenshot-16387.html> on Feb. 17, 2009).

(1 0 of 11) iMagic Restaurant Reservation webpages—Feature List Page <http://imagicrestaurantsoftware.com/RestaurantFeaturelist.php> (<http://web.archive.org/web/20101010143353/http://www.imagicrestaurantsoftware.com/RestaurantFeaturelist.php> on Oct. 10, 2010).

(11 of 11) iMagic Restaurant Reservation webpages—FAQ page <http://www.imagicrestaurantsoftware.com/RestaurantFAQ.php> (<http://web.archive.org/web/20100326075907/http://www.imagicrestaurantsoftware.com/RestaurantFAQ.php> on Mar. 26, 2010). Guestbridge webpages <http://guestbridge.com/reserve/reservetablemgmt.html>, <http://www.guestbridge.com/FAQs.html> (<http://web.archive.org/web/20100311215727/http://guestbridge.com/reserve/reservetablemgmt.html> on Mar. 11, 2010 and <http://web.archive.org/web/20100402214357/http://www.guestbridge.com/FAQs.html> on Apr. 2, 2010).

Radiant Systems, Case Study "Aloha Guest Manager Improves Table Management Efficiencies at Texas Roadhouse", copyright 2008.

Google Guide, "Results Page" <http://www.googleguide.com/results_page.html>(<http://web.archive.org/web/20100209012141/http://www.googleguide.com/results_page.html> on Feb. 9, 2010).

(1 of 2) Vidotto, Alfio, "Managing Restaurant Tables Using Constraint Programming", Nov. 2007, pp. 4, 9, 19-20, 58-59, 72-73, 76, 103-105, 128-132, 136, 138.

(2 of 2) Vidotto, Alfio, "Managing Restaurant Tables Using Constraint Programming", Nov. 2007. pp. 211-212, 232, 253.

* cited by examiner (2) Jones, Trevor

Status: Confirmed

Name:         Jones, Trevor
Time:         7:15 PM
Party Size:   2
Table:        10

Reservation Notes/Codes:

Guest Notes/Codes:

Move                    Seat

Cancer  — 600

Add Wait List Entry  [Cancel] [Save]

Party Size:  Wait Time:  Preferences:

| 1 | 2 | 3 | 4 |

0:30 min  [Requests]

Est. Seating Time:

| 5 | 6 | 7 | ▽ |

Table: 12

7:53 PM

[All Arrived] [Partially Arrived]

806

Last Name:  First Name:  Phone:  808

Smith  Sally  510-555-9876

Reservation

810

Notes  Codes

(2) Smith, Sally

Status: Arrived

Name:        Smith, Sally
Phone:       510-555-9876
Party Size:  2
Arrived:     8:14
Quoted:      8:44

Table:       12    ⤳ 952

954 ⤳ Est Seating:  8:39

Reservation Notes/Codes:

Seat

| Reservations | Covers | Reserv. | Timers | Servers |
| Waiting List | | | | |

Party Size:

| 1 | 2 |
| 3 | 4 |
| 5 | 6 |
| 7 | ▽ |

Table 2
Table 4
Table 17
Table 15
Table 14
Table 1
Table 5
Table 3
Table 10
Table 13
Table 8
Table 7
Table 12

1052

1054

Map View ⌐ 1056    Make Reservation   Walk In

GRAPHICAL USER INTERFACE FOR A RESTAURANT MANAGEMENT SYSTEM INCLUDING A STATUS INDICATOR

This application claims priority to U.S. Provisional Patent Application No. 61/488,677 entitled SYSTEM WITH REMOTE ACCESS FOR MANAGING RESTAURANT RESERVATIONS filed May 20, 2011 which is incorporated herein by reference for all purposes.

BACKGROUND OF THE INVENTION

Restaurants have been traditionally managed using pencil and paper systems for tracking reservations, waiting lists, and party seating. Restaurant management systems have migrated to take advantage of computer technology as it has advanced, increasing power and flexibility over paper systems. However, typical systems today are confined to desktop or laptop computer systems and use only the standard interfaces of a keyboard and mouse.

BRIEF DESCRIPTION OF THE DRAWINGS

Various embodiments of the invention are disclosed in the following detailed description and the accompanying drawings.

FIG. 6 is a diagram illustrating a reservation data window in a graphical user interface of a restaurant management system.

FIG. 8 is a diagram illustrating an embodiment of a graphical user interface for adding a waiting list entry using a restaurant management system.

FIG. 9B is a diagram illustrating a waiting list entry data window in a graphical user interface of a restaurant management system.

FIG. 10B is a diagram illustrating an embodiment of a graphical user interface including a list table suggestion interface in a restaurant management system.

FIG. 18 is a block diagram illustrating an embodiment of a screen shot of a grid view for viewing reservations.

FIG. 20 is a block diagram illustrating an embodiment of a screen shot of a book view for viewing reservations.

FIG. 24 is a block diagram illustrating an embodiment of a screen shot of a dialog view for making a reservation.

FIG. 26 is a block diagram illustrating an embodiment of a screen shot for adding a walk-in.

FIG. 39 is a block diagram illustrating an embodiment of a screen shot for searching guests.

DETAILED DESCRIPTION

Figure 1:
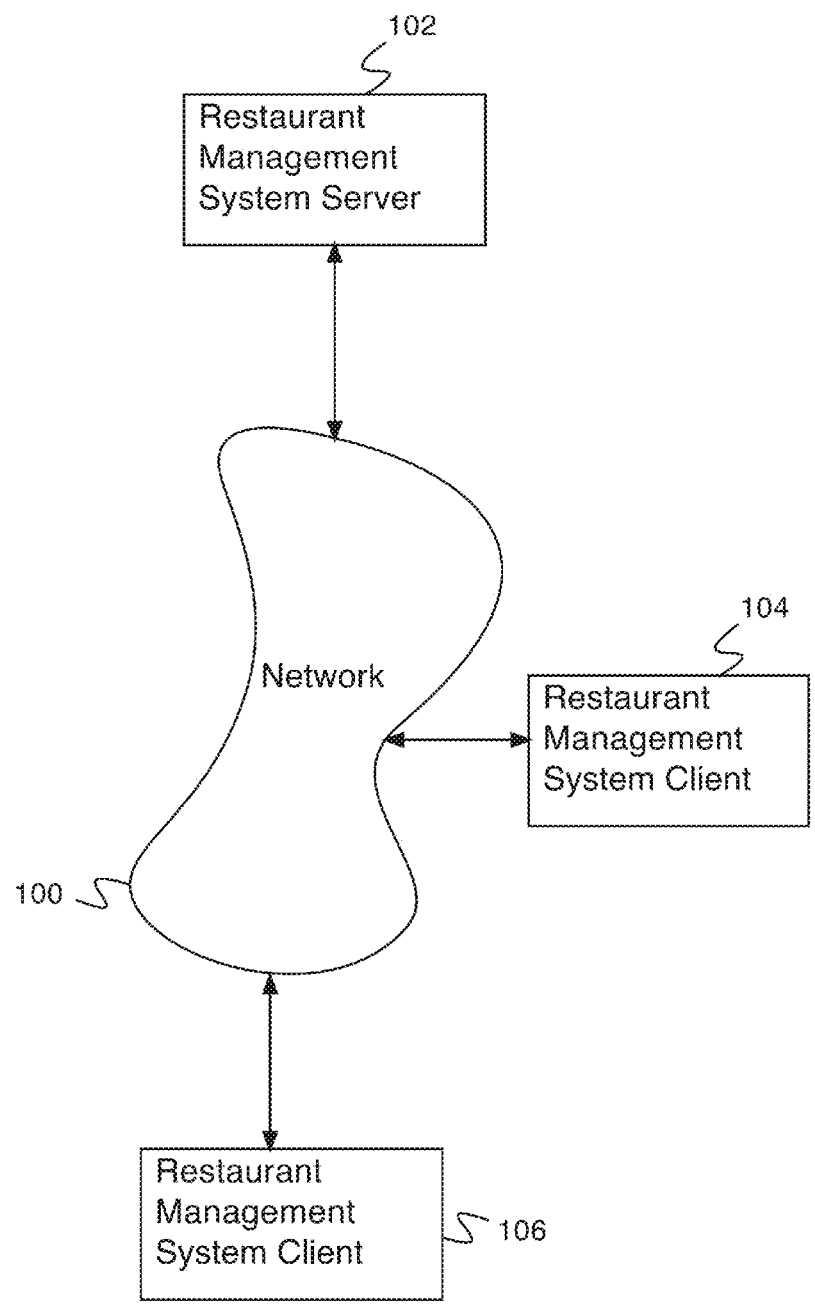
FIG. 1 is a diagram illustrating an embodiment of a network system for a restaurant management system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for managing a restaurant is disclosed. The system comprises a restaurant server comprising a graphical user interface. The graphical user interface comprises a display and an input interface. The display displays reservation information for the restaurant. The reservation information includes a colored indicator of a status. The input interface receives an indication to display the reservation information for the restaurant.

A system for managing a restaurant is disclosed. The system comprises a restaurant server comprising a graphical user interface. The graphical user interface comprises a display and an input interface. The display displays reservation information for the restaurant. The reservation information includes a suggested seating table. The input interface receives an indication to display the reservation information for the restaurant.

A system for managing a restaurant is disclosed. The system comprises a restaurant server comprising a graphical user interface. The graphical user interface comprises a display and an input interface. The display displays reservation information for the restaurant. The reservation information includes an estimated waiting time for a waiting list entry. The input interface receives an indication to display the reservation information for the restaurant.

A system for managing a restaurant is disclosed. The system comprises a restaurant server with an internet interface and an integrated or separate GUI interface. The Internet interface is capable of receiving reservation information (e.g., from a user in the process of creating a reservation over the Internet) and providing reservation availability information (e.g., to a user in the process of creating a reservation over the Internet). The GUI interface comprises a graphical user interface including sections for displaying tables, reservations, and/or a waiting list. In various embodiments, a restaurant employee uses the graphical user interface to make reservations, add walk-in guests to a waiting list, seat parties, check the status of a table, check a party waiting time, or for any other appropriate restaurant management tasks. In some embodiments, the graphical user interface runs on a desktop computer that is set up at the restaurant (e.g., at the station of the host or hostess). In some embodiments, the graphical user interface runs on a handheld portable computer that is carried around the restaurant by a restaurant employee. In some embodiments, the graphical user interface runs on a computer or other portable device that includes a wireless network connection. In some embodiments, the graphical user interface software runs on a server computer (e.g., which can be located anywhere) and is accessed through client computers (e.g., which can be handheld or located at any appropriate location in the restaurant). In some embodiments, the graphical user interface is operated by using a touch screen.

In some embodiments, the graphical user interface includes a colored indicator for indicating the status associated with a table. In various embodiments, the status associated with a table/reservation comprises special, cancelled, no show, expected, not confirmed, confirmed, left message, no answer, wrong number, late, in house, partially arrived, all arrived, paged, seated, partially seated, entrée, cleared, dessert, check dropped, cleaned, paid, bus table, done, empty, ordered, or any other appropriate status. In some embodiments, a colored indicator appears associated with each table on a displayed map of tables in the restaurant using the graphical user interface (GUI) allowing a restaurant employee to quickly learn the overall status of the restaurant. In various embodiments, the color indicator comprises a region of the display, a region of the reservation list (e.g., a colored button, a colored end of a region, the entire button, the entire tab, etc.), or a region of the floor map (e.g., a table top, a table top and chairs, etc.). In some embodiments, the system includes a button for changing the status associated with a table. In various embodiments, the button for changing the status associated with a table is located on a map of tables in the restaurant, is located in a window accessed by selecting a table from a map of tables in the restaurant, or is located in any other appropriate location in the graphical user interface. In some embodiments, the button cycles through a sequence of states enabling easy setting of the different status states. In some embodiments, the system includes a button for toggling the status associated with a floor timer. In various embodiments, a floor timer comprises a timer for timing the duration a party has been seated, a timer for timing the duration a party has maintained its current status, or a timer for timing any other appropriate duration. In various embodiments, the button for toggling the status associated with a floor timer is located on a map of tables in the restaurant, is located in a window accessed by selecting a table from a map of tables in the restaurant, or is located in any other appropriate location in the graphical user interface.

In some embodiments, the graphical user interface includes a list of seating tables. In various embodiments, the list of suggested seating tables comprises a list of suggested seating tables for reservations, a list of suggested seating tables for parties seated from a waiting list, a combined list of suggested seating tables for reservations and parties seated from a waiting list, or any other appropriate suggested seating tables. In some embodiments, the graphical user interface includes two lists of suggested seating tables, one for reservations and one for parties seated from a waiting list. In some embodiments, when a reservation is selected, one or more suggested tables for seating the party associated with the reservation are highlighted. In some embodiments, when a waiting list entry is selected, one or more suggested tables for seating the party associated with the waiting list entry are highlighted (e.g., one or more tables are suggested using a rule set, calculation of optimal table, or heuristic, etc.). In some embodiments, the list of suggested seating tables is generated by calculating all combinations of tables that satisfy a given seating request, provided in the order of one or more criteria (e.g., leaving the largest possible number of combinations of tables available, maximizing availability, maximizing turnover, maximizing utilization of a server, of a view area, of a window area, minimizing wait time, etc.).

In some embodiments, the waiting list includes an estimated waiting time for the party associated with each entry. Estimated waiting times are displayed associated with each entry in the waiting list. In some embodiments, estimated waiting times are determined by a restaurant employee and entered into the system along with the waiting list entry. In some embodiments, estimated waiting times are determined by the system automatically from the status of the restaurant and the size of the party waiting. In some embodiments, when an entry in the waiting list is associated with a table, the estimated waiting time for the party associated with the entry in the waiting list to be seated at the associated table is displayed. In some embodiments, the waiting time is estimated by calculating all combinations of tables that satisfy each entry in the waiting list and selecting the table combination for each entry in the waiting list that minimizes waiting time. In various embodiments, the waiting time is estimated by calculating the estimated completion of each table based on the table's current time progress, the diner's historical time progress from other visits, from a profile or model of progress, an expected departure time (e.g., a theater curtain time), or any other appropriate estimation technique.

In some embodiments, any change to a reservation or seated party that possibly affects a waiting party causes reassignment of parties to optimize a waiting time. In some embodiments, any change to a reservation or seated party that possibly affects table usage causes reassignment of some or all unseated parties to optimize a table usage and/or increase yield.

FIG. 1 is a diagram illustrating an embodiment of a network system for a restaurant management system. In the example shown, restaurant management system server 102 comprises a computer for running restaurant management system software. Restaurant management system server 102 stores restaurant management system data (e.g., using a non-transitory storage device, a hard drive, etc.) and executes restaurant management system software (e.g., using a processor with memory for storing instructions for the processor). One or more restaurant management system clients (e.g., restaurant management system client 104, restaurant management system client 106) communicate with restaurant management system server 102 via network 100. In various embodiments, network 100 comprises a local network, a wide area network, the Internet, Ethernet, a wired network, a wireless network, a cellular network, a public network, a private network, or any other appropriate network. A restaurant management system client comprises a computer for interacting with the restaurant management system—for example, for entering data into the restaurant management system, reading data from the restaurant management system, etc. In various embodiments, a restaurant management system client comprises a desktop computer at a restaurant entrance, in a restaurant office, or in any other appropriate location; a portable computer stationed at a restaurant entrance or carried throughout the restaurant by a restaurant employee; or any other appropriate restaurant management system client. In various embodiments, restaurant management system client comprises a laptop computer, a tablet computer, a mobile phone, an iPhone™, an iPad™, an Android™ Operating System device, a Blackberry™, or any other appropriate computer or portable device. In some embodiments, the one or more restaurant management system clients simultaneously access restaurant management system data and restaurant management system software from restaurant management system server 102. In some embodiments, the restaurant management system server and the restaurant management system client are contained within a single computer, performing all the functions of the restaurant management system.

Figure 2A:
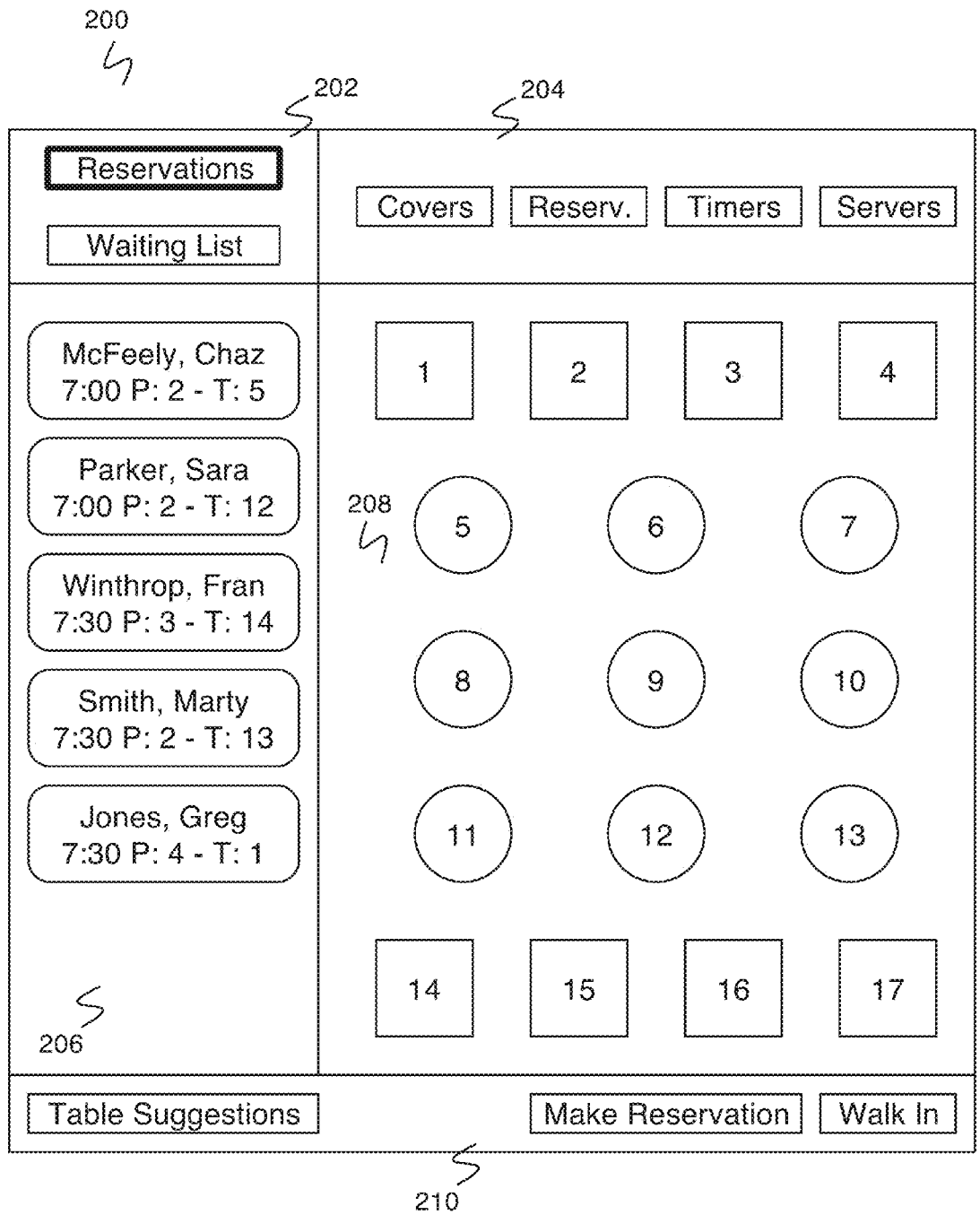
FIG. 2A is a diagram illustrating an embodiment of a graphical user interface for a restaurant management system.

FIG. 2A is a diagram illustrating an embodiment of a graphical user interface for a restaurant management system. In some embodiments, the graphical user interface for a restaurant management system executes on a restaurant management system client (e.g., restaurant management system client 104 or FIG. 1 or restaurant management system client 106 of FIG. 1) and accesses data stored on a restaurant management system server (e.g., restaurant management system server 102 of FIG. 1). In the example shown, graphical user interface 200 comprises a graphical user interface for a restaurant management system. Graphical user interface 200 comprises list selector box 202, map data selector box 204, list box 206, map box 208, and seating function box 210.

List selector box 202 comprises a reservations button and a waiting list button for selecting the desired list to be shown in list box 206. Upon pushing a button in list selector box 202, list box 206 displays the list selected by pushing the button (e.g., a list of reservations, a waiting list). In the example shown, the reservations box is selected, and the list shown in list box 206 comprises a list of upcoming reservations. Each entry in list box 206 corresponds to an individual reservation, and shows the associated name, reservation time, party size, and reserved table number. More information and options related to a reservation are accessible by selecting the reservation entry in list box 206, which will produce a pop-up window with more information. In some embodiments, list box 206 shows other appropriate data or controls (e.g., a party size selector bar) and is returned to list display by selecting a button from list selector box 202.

Map data selector box 204 comprises a set of map data selector buttons for selecting data sets to be shown in map box 208. In the example shown, map data selector box 204 contains a covers button, a reservations button, a timers button, and a servers button. In some embodiments, the buttons in map data selector box 204 are identified by images or icons rather than by text names. The covers button toggles display of covers (e.g., the number of diners or number of seats in the restaurant that can seat a diner) in map box 208. The reservations button toggles display of reservations (e.g., times of upcoming reservations for each table)

in map box 208. The timers button toggles display of timers (e.g., how long has each party been seated at each table, how long has each party had its current status, etc.) in map box 208. The servers button toggles display of servers (e.g., which server is assigned to each table identified by name or number) in map box 208. Map box 208 displays a map of tables in the restaurant (e.g., a layout of the restaurant and/or an indication of combinable tables), as well as any other appropriate data as selected in map data selector box 204. In some embodiments, map box 208 includes an indicator associated with each table indicating the status associated with that table (e.g., a color—for example, an empty table is shown blank, a table is shown blue during its meal, a table is shown pink during dessert, a pattern—for example, stripes, dots, or any other appropriate indicator, etc.). In some embodiments, the map is zoomable and scrollable (e.g., using a finger or a multiple finger indication and/or motion). In some embodiments, the map is divided into multiple sections (e.g., first floor, second floor, patio, etc.) and the appropriate map section to display is selected using a set of selector buttons.

Seating functions box 210 comprises controls related to party seating. In the example shown, seating functions box 210 comprises a table suggestions button, a make reservation button, and a walk in button. The table suggestions button toggles a display of suggestions for upcoming available tables. The make reservation button begins a make reservation process. The walk in button begins a process for receiving a walk in guest. In some embodiments, when the walk in button is selected, the restaurant management system determines if it can seat the walk in party immediately. In the event that the restaurant management system determines that the walk in party can be seated immediately, the system allows the selection of a table or suggests a table for the party so that they can be seated. In the event that the restaurant management system determines that the walk in party cannot be seated immediately, the restaurant management system begins a process for adding an entry to the waiting list. In some embodiments, seating functions box 210 additionally comprises an add wait button. The add wait button directly begins a process for adding an entry to the waiting list.

Figure 2B:
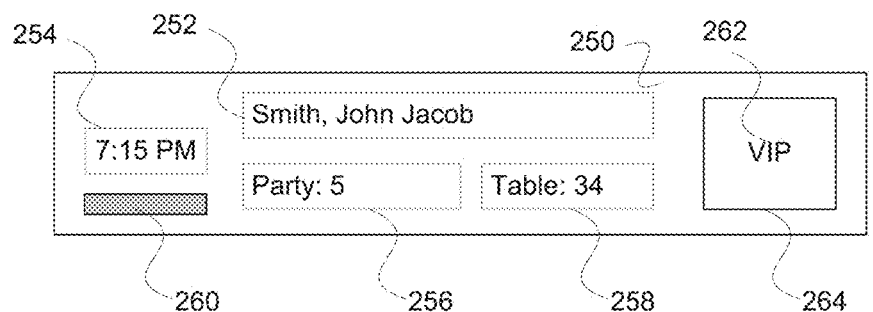
FIG. 2B is a diagram illustrating an embodiment of a reservation display.

FIG. 2B is a diagram illustrating an embodiment of a reservation display. In the example shown, reservation display 250 shows name field 252, time field 254, party size field 256, table field 258, status indicator 260, notes indicator 264, and notes indicator text 262 (e.g., very important person (VIP)). Name field 252 displays a name or label associated with a party (e.g., last name, first name, group name, company name, etc.). Time field 254 displays a start time associated with the reservation. Party size field 256 displays a number of people associated with a reservation. Table field 258 displays a table number or name associated with the reservation. Status indicator 260 displays an indication of the status of the reservation. For example, a color, a pattern, a texture, a letter code or symbol is displayed associated with the status. Status indicator 260 enables a user to rapidly assess the status of many reservations using a quick visual scan of the display. Note indicator 264 comprises a color or a flag or a geometrical indicator. Notes indicator text 262 adds a note indication in addition to the note indicator 264 (e.g., a text indicating VIP status or vegetarian status or an allergy status).

In various embodiments, a status indicator comprises a colored region, a colored tab, a colored table, a colored area of the user interface, a textured region, a flashing region, or any other appropriate indicator of status. In various embodiments, the region comprises a tab or field or an entire area associated with the wait list, the reservation list, the table map, or any other appropriate user interface area.

Figure 2C:
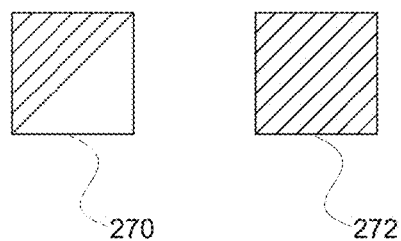
FIG. 2C is a diagram illustrating an embodiment of note indicators.

FIG. 2C is a diagram illustrating an embodiment of note indicators. In the example shown, note indicator 270 shows an area with an upper section of one pattern and a lower section with a different pattern. For example, the upper section is displayed with one color and a lower section is displayed with a different color. This allows many different note combinations. In various embodiments, different geometric shapes are used, for example, the overall shape is a square, a circle, an oval, a polygon, the shape is segmented in halves left/right, top/bottom, the shape has a different inner shape and outer shape—for example, a circle in a square, or any other combination of shapes with colors or textures/patterns. Note indicator 272 shows a note indicator with the entire shape with a single pattern (e.g., a single color) that is associated with a reservation.

Figure 2D:
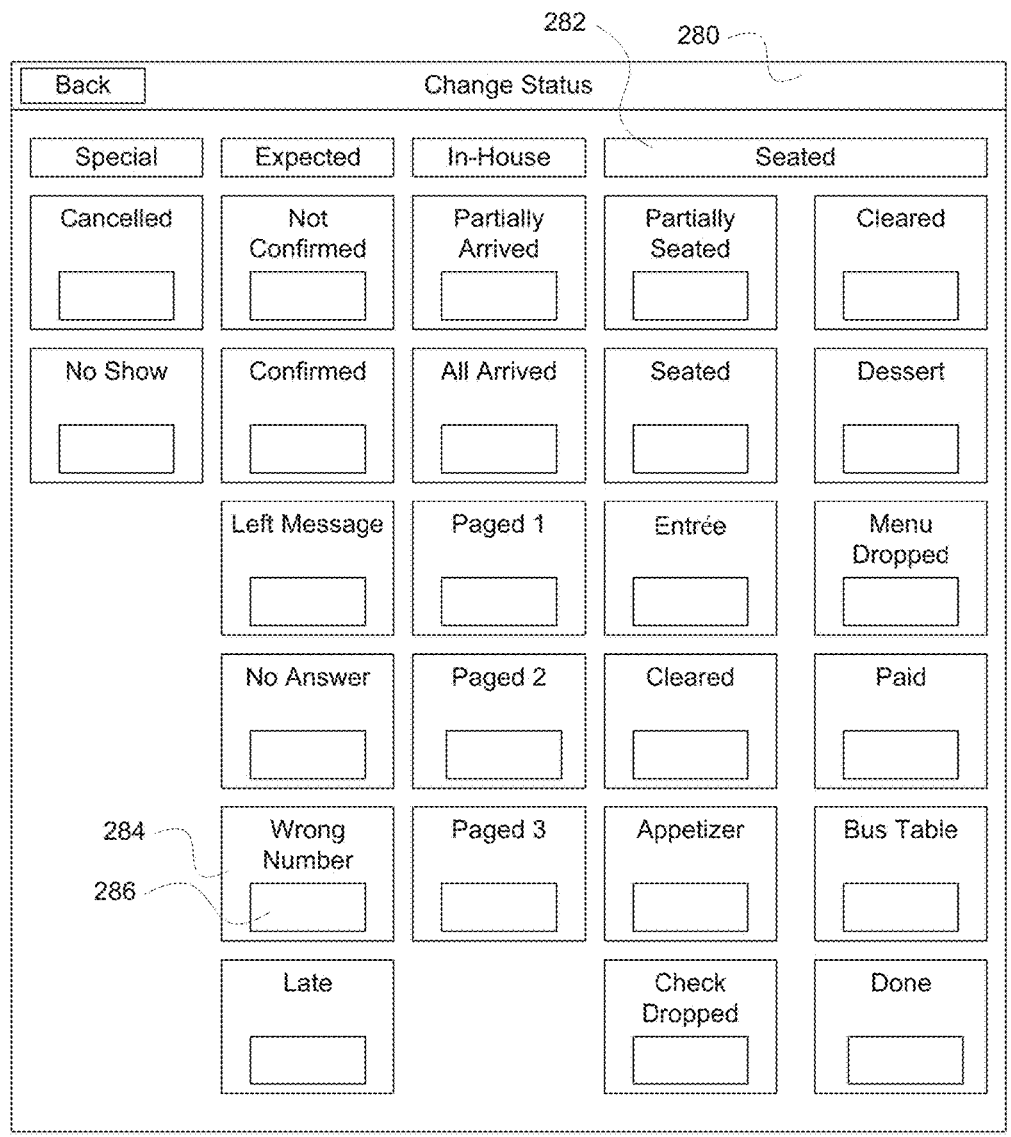
FIG. 2D is a diagram illustrating an embodiment of a change status user interface.

FIG. 2D is a diagram illustrating an embodiment of a change status user interface. In the example shown, change status window 280 displays a user interface window for changing a status. For example, a reservation status is changed using a button (e.g., button 284 to change the status to 'wrong number'). A plurality of status buttons are displayed—for example, no show, not confirmed, confirmed, left message, no answer, wrong number, late, partially arrived, all arrived, paged 1, paged 2, paged 3, partially seated, seated, entrée, cleared, appetizer, check dropped, cleared, dessert, menus dropped, paid, bus table, done, etc. Each status button is associated with a distinct or separate or different color or texture or flashing sequence or other visually recognizable marker (e.g., a color, a texture, a flashing sequence, or visually recognizable marker in region 286). The status states are displayed under a status category (e.g., seated category 282). In some embodiments, a sequence of states is specified (e.g., all arrived, seated, appetizer, entrée, dessert, cleared, check dropped, paid, bus table, etc.) that is used by toggle activation of a status button or display in other user interface displays (e.g., status indicator button, color status display region, etc.). For example, pushing the color status display region changes the current status to the next status in the sequence (e.g., 'entrée' changed to 'dessert' when a status button is pushed or toggled). In some embodiments, the arrangement of the status buttons and their position on the screen is configurable and the content of the status button is customizable by the restaurant.

In various embodiments, an indication to view reservation information (e.g., status information, wait list information, table information, server information, etc.) from a user is received by one or more of the following: starting or turning on a reservation system, indicating a desire to view reservation information, waiting list information, table information, server information, guest information, or any other appropriate indication.

Figure 3:
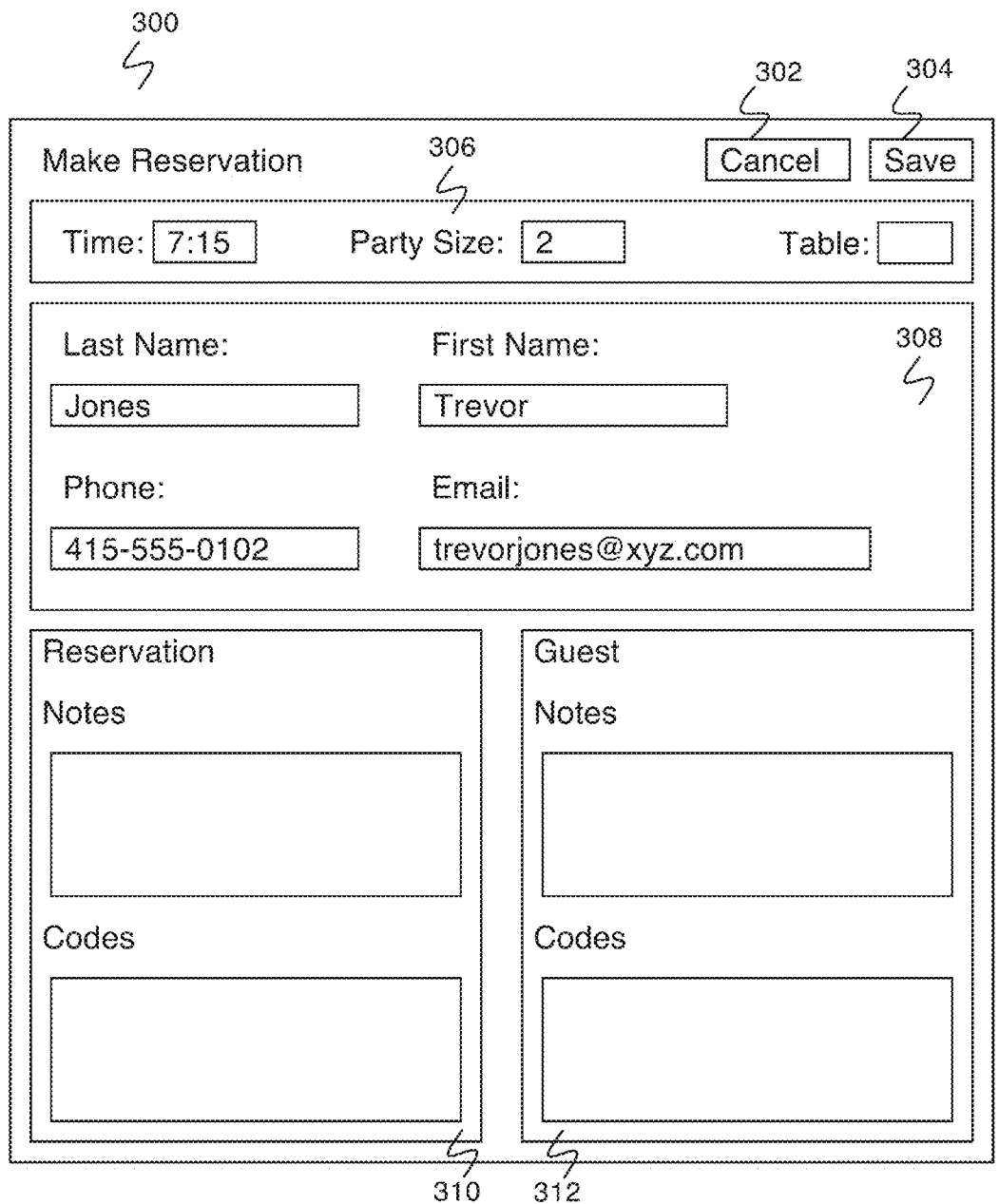
FIG. 3 is a diagram illustrating an embodiment of a graphical user interface for making a reservation using a restaurant management system.

FIG. 3 is a diagram illustrating an embodiment of a graphical user interface for making a reservation using a restaurant management system. In some embodiments, the interface of FIG. 3 is displayed as a pop-up window superimposed on the graphical user interface of FIG. 2A. In some embodiments, the interface of FIG. 3 appears in response to a user selection of a make reservation button (e.g., the make reservation button shown in seating functions box 210 of FIG. 2A). In the example shown, make reservation window 300 comprises cancel button 302, save button 304, reservation information box 306, contact information box 308, reservation notes and codes box 310 and guest notes and codes box 312. Cancel button 302 exits the make reservation process without creating any new data. Save button 304 creates a new reservation using the data entered using make reservation window 300.

Reservation information box 306 comprises data entry fields for basic reservation information. In the example shown, reservation information box 306 comprises a time box for entering the reservation time, a party size box for entering the reservation party size, and a table box for entering the reservation table, if appropriate (e.g., window seat, special table, etc.). In various embodiments, reservation time is entered using a keyboard, a number pad, a time selector interface window, a dial menu, or using any other appropriate method. In various embodiments, reservation party size is entered using a keyboard, a number pad, a party size selector interface window, a dial menu, or using any other appropriate method. In various embodiments, the reservation table is determined by a restaurant employee without assistance from the interface, and entered using a keypad, a number pad, a reservation table selector window, or using any other appropriate method. In some embodiments, selecting the table box brings up a table suggestion interface for suggesting a reservation table. The table suggestion interface accesses a list of suggested tables created by the restaurant management system and shows the most appropriate suggestion. A restaurant employee can agree to the suggestion, see the next suggestion, or directly select his desired table. In various embodiments, the suggested table is determined using a rule set, a calculation of permutations and combinations based on the upcoming reservations, based on maximizing availability, based on maximizing covers, based on equalizing server loads, or based on any other appropriate criteria.

Contact information box 308 comprises data entry fields for entering reservation contact information. In the example shown, contact information box 308 comprises a last name box, a first name box, a phone number box, and an email address box. In some embodiments, the interface stores guest contact information when a reservation is made, allowing automatic completion of a guest's contact information for future reservations. In some embodiments, contact information box 308 additionally includes a pop-up menu of known guests, such that a restaurant employee can select a guest from the menu and have the contact information automatically entered into the data entry fields.

Reservation notes and codes box 310 comprises data entry fields for reservation notes and reservation codes. The reservation notes data entry field comprises an unstructured text box for entering notes related to the reservation. The reservation codes data entry field comprises a box for entering reservation codes selected from a list of typical reservation codes (e.g., quiet table, anniversary, etc.). Guest notes and codes box 312 comprises data entry fields for guest notes and guest codes. The guest notes data entry field comprises an unstructured text box for entering notes related to the guest. The guest codes data entry field comprises a box for entering guest codes selected from a list of typical guest codes (e.g., VIP, friend of the head chef, etc.).

In various embodiments, guest history information is displayed (e.g., average dollars spent, total dollars spent, number of visits, typical party size, etc.), current check total information is displayed, or any other appropriate history or analytics information is displayed.

Figure 4:
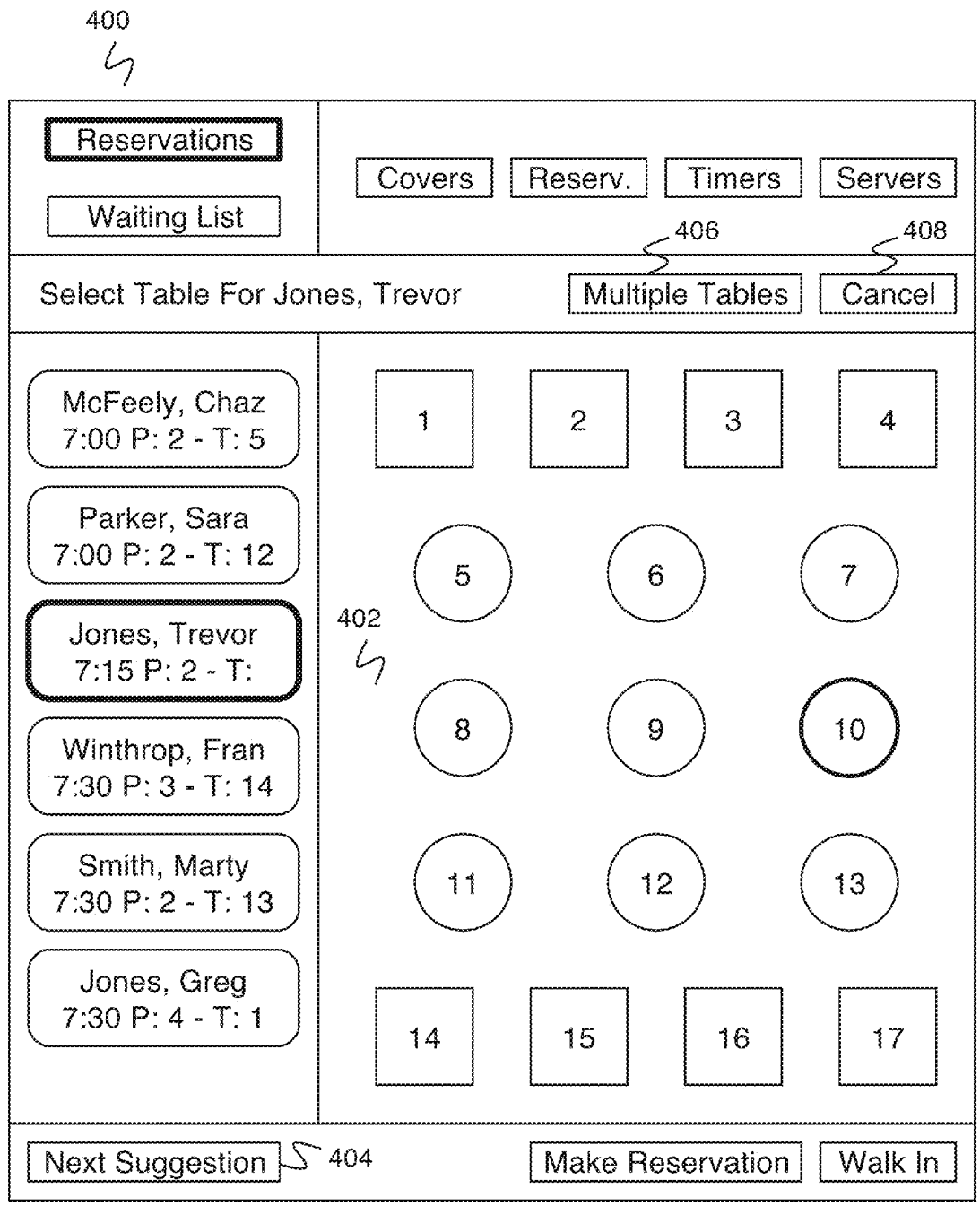
FIG. 4 is a diagram illustrating an embodiment of a graphical user interface including a table selection interface in a restaurant management system.

FIG. 4 is a diagram illustrating an embodiment of a graphical user interface including a table selection interface in a restaurant management system. In some embodiments, the graphical user interface of FIG. 4 comprises the graphical user interface of FIG. 2A in a table selection mode. In some embodiments, the table selection interface is accessed by selecting a table box (e.g., the table box of reservation information box 306 of FIG. 3). In the example shown, a table is being selected as part of creating a reservation (e.g., using make reservation window 300 of FIG. 3). Graphical user interface 400 comprises map box 402, which displays a map of tables in the restaurant. A restaurant employee can select a desired table to assign to the reservation being created by indicating—for example, by tapping on a table, typing a table number in a window, etc.—the table in map box 402. In some embodiments, map box 402 indicates a table to the restaurant employee as a suggested table (e.g., the table marked as table 10). In various embodiments, the suggested table is indicated using flashing, a color, a shading, an outline, an arrow, a box, or any other appropriate indicator. In some embodiments, a user is able to select a suggested table from a list of suggested tables. The graphical user interface additionally comprises next suggestion box 404. A restaurant employee can see a different suggested table by selecting next suggestion button 404. In some embodiments, when graphical user interface 400 is accessed, a list of suggested tables is accessed, and the first table on the list is indicated as the suggested table. If next suggestion button 404 is selected, the next selection from the list of suggested tables is indicated. In some embodiments, the list of suggested tables is created by the restaurant management system in real time when graphical user interface 400 is accessed, in response to the reservation time, the reservation party size, the current restaurant situation, the current restaurant reservations, and any other appropriate factors.

Graphical user interface 400 additionally comprises multiple tables box 406. Multiple tables box 406 changes the mode of graphical user interface 400 such that selecting a table toggles an indicator associated with it on and off without exiting. Multiple tables can be selected in this way. A done button is added to graphical user interface 400 when multiple tables button 406 is selected for indicating that a satisfactory selection of multiple tables has been chosen. When multiple tables button 406 is selected, the table suggestion interface changes to display multiple suggested tables. In some embodiments, a list of multiple table combinations is accessed, and the first multiple table combination on the list is suggested. Further multiple table combinations on the list are accessed using next suggestion box 404.

Graphical user interface 400 additionally comprises cancel box 408. Cancel box 408 cancels the table selection and returns the user to the interface from which graphical user interface 400 was accessed (e.g., make reservation window 300 of FIG. 3).

Figure 5:
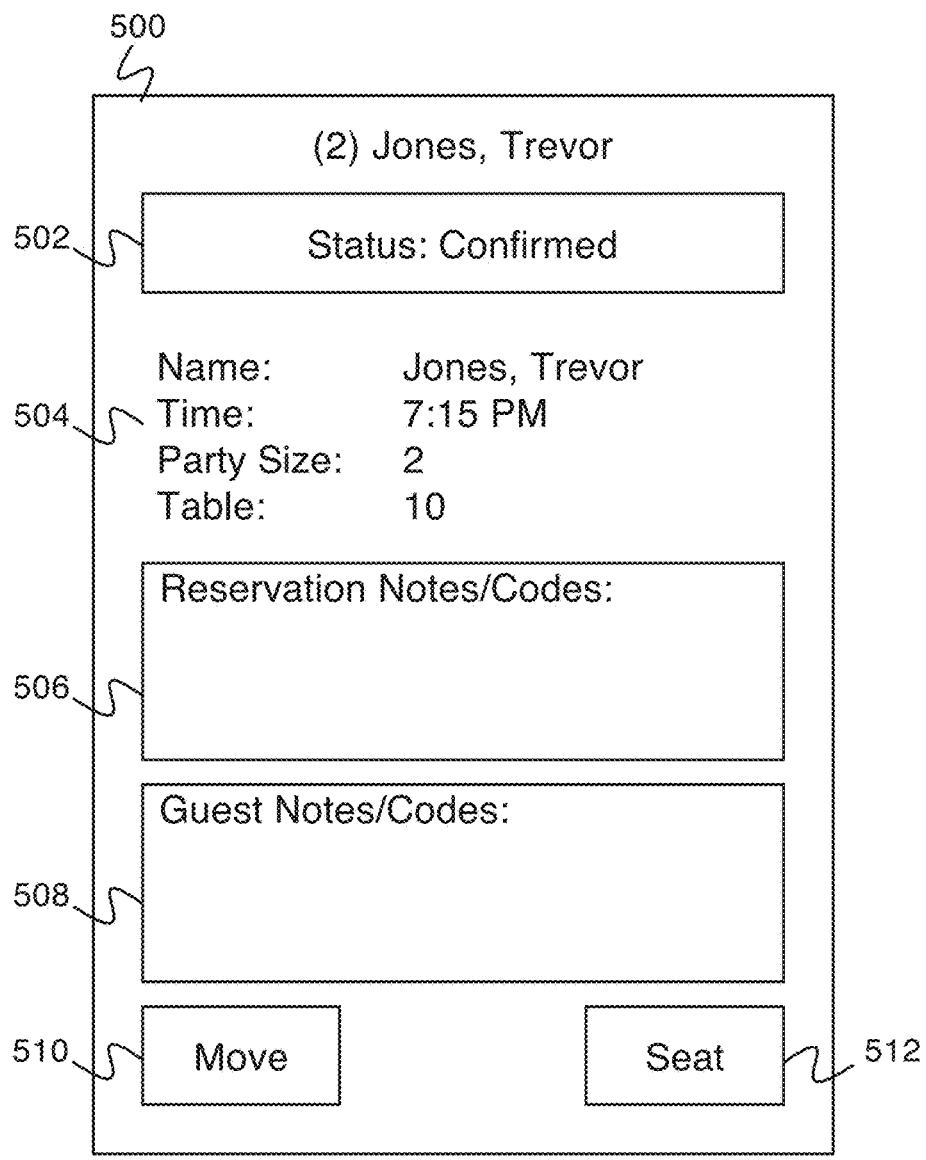
FIG. 5 is a diagram illustrating a reservation data window in a graphical user interface of a restaurant management system.

FIG. 5 is a diagram illustrating a reservation data window in a graphical user interface of a restaurant management system. In some embodiments, reservation data window 500 is accessed by selecting a reservation from a reservation list (e.g., from list box 206 of FIG. 2A). In some embodiments, reservation data window 500 is displayed as a pop-up window superimposed on the graphical user interface of FIG. 2A. In the example shown, reservation data window 500 shows the party size and name associated with the reservation to quickly identify the reservation to a restaurant management system user. Status box 502 shows the current status of the reservation (e.g., not confirmed, confirmed, arrived, etc.). In some embodiments, status box 502 displays a color along with the text status for easier viewing recognition. In some embodiments, selecting status box 502 toggles to the next status. In some embodiments, selecting status box 502 takes the restaurant management system user to a change status window where a status can be selected. Details section 504 displays reservation details (e.g., name, time, party size, table, etc.). Selecting the reservation details shown in details section 504 allows the details to be modified (e.g., in the event of a time change or a party size change). Reservation notes and codes box 506 displays reservation notes and codes entered when the reservation was created. Selecting reservation notes and codes box 506 takes the restaurant management system user to a change reservation notes and codes window where reservation notes and codes can be changed. Guest notes and codes box 508 displays guest notes and codes entered when the reservation was created. Selecting guest notes and codes box 508 takes the restaurant management system user to a change guest notes and codes window where guest notes and codes can be changed. Move button 510 takes the restaurant management system user to a table selection interface (e.g., the table selection interface shown in FIG. 4), allowing the restaurant management system user to assign the reservation to a different table. Seat button 512 allows the reservation management system user to seat the party, updating the status of the party and allowing the party to be assigned to the table.

FIG. 6 is a diagram illustrating a reservation data window in a graphical user interface of a restaurant management system. In some embodiments, the reservation data window of FIG. 6 comprises the reservation data window of FIG. 5 with a cancel reservation button displayed. Cancel button 600 cancels the displayed reservation, removing it from the system. In some embodiments, a cancel reservation button is hidden or not displayed in the default view of the reservation data window. Cancelling a reservation is a less-used function that is not necessary to display by default. Cancelling a reservation accidentally is highly undesirable, adding an incentive to hide the function. In various embodiments, the cancel button is displayed by scrolling the reservation data window, by double clicking on the reservation data window, by selecting a more options button in the reservation data window, or by any other appropriate means. In some embodiments, selecting cancel button 600 causes a confirmation box to be displayed, where the user confirms the reservation cancellation before it is executed.

Figure 7:
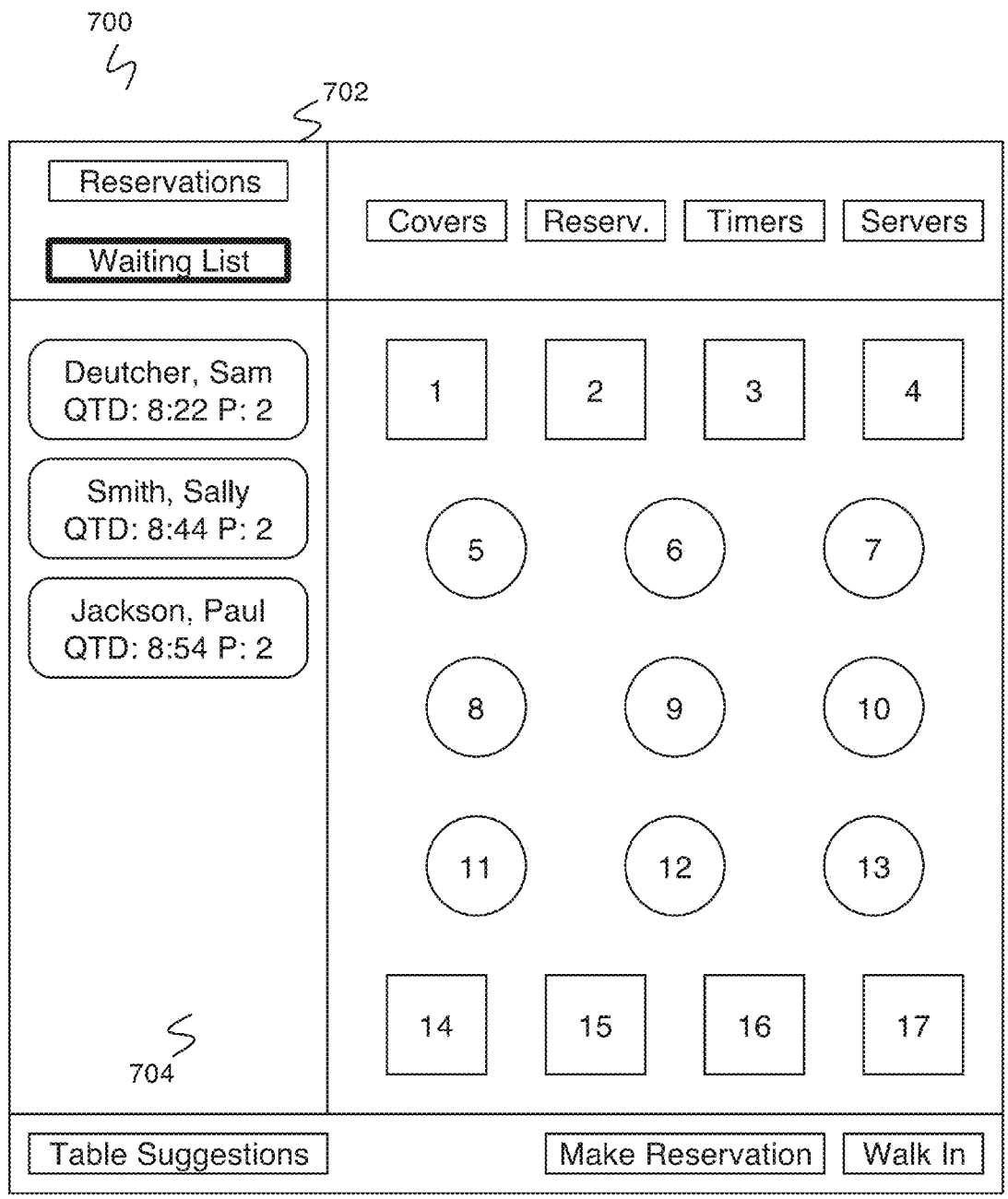
FIG. 7 is a diagram illustrating a graphical user interface for a restaurant management system.

FIG. 7 is a diagram illustrating a graphical user interface for a restaurant management system. In some embodiments, the graphical user interface of FIG. 7 comprises the graphical user interface of FIG. 2A in a waiting list display mode. In some embodiments, the waiting list display is accessed by selecting the waiting list box of list selection box 702. List box 704 comprises a list of upcoming waiting list entries. Each entry in list box 704 corresponds to an individual waiting list entry, and shows the associated name, quoted seating time, and party size. In some embodiments, each entry in the waiting list includes a display of estimated waiting time. More information and options related to a waiting list entry can be accessed by selecting a waiting list entry from list box 704.

FIG. 8 is a diagram illustrating an embodiment of a graphical user interface for adding a waiting list entry using a restaurant management system. In some embodiments, the interface of FIG. 8 is displayed as a pop-up window superimposed on the graphical user interface of FIG. 2A. In some embodiments, the interface of FIG. 8 appears in response to a user selection of a walk in button (e.g., the walk in button of seating functions box 210 of FIG. 2A). In some embodiments, the interface of FIG. 8 appears in response to a user selection of an add wait button (e.g., an add wait button as described in the section regarding FIG. 2A). In the example shown, add wait list entry window 800 comprises cancel button 802, save button 804, waiting list entry information box 806, contact information box 808, and reservation notes and codes box 810. Cancel button 802 exits the add waiting list entry process without creating any new data. Save button 804 creates a waiting list entry using the data entered.

Waiting list entry information box 806 comprises data entry fields for basic waiting list entry information. In the example shown, waiting list entry information box 806 comprises a party size selector for selecting the party size, a wait time entry field for entering the estimated waiting time and estimated seating time display, and a preferences selector for entering party preferences. The party size picker allows the restaurant employee to quickly enter the party size and indicate whether the entire party has arrived. The last button of the party size picker comprises an arrow, indicating that larger size parties may be entered by selecting the arrow and then selecting the party size from a secondary selector display. In various embodiments, estimated waiting time is determined by a restaurant employee and entered using a keypad, a number pad, a wait time selector window, or any other appropriate method. In some embodiments, a waiting time is estimated by the restaurant management system and automatically entered into the waiting time entry field. In some embodiments, the waiting time estimate is calculated using all combinations and permutations of tables and reservation information along with criteria for maximizing table availability, maximizing turnover, minimizing wait time, etc. The estimated seating time display displays the estimated seating time based on the estimated waiting time and the current time. The preferences selector comprises a requests box and a preferred table box. The requests box allows a user to enter requests (e.g., anniversary, birthday, booth, view) to be associated with the waiting list entry. The preferred table box allows the guest's preferred table to be associated with the waiting list entry. In various embodiments, the waiting time is estimated using historic data for the restaurant, the client, the time, the date, the occasion, the employee and the system (e.g., a system estimates the time using historic data and estimated combinations of availability and then is allowed to be adjusted by the employee (e.g., adding time, taking time off, etc.)), or any other appropriate waiting time estimate determination.

In some embodiments, the system receives an indication to view the estimated waiting time for a waiting list entry comprising one or more of the following: an indication to start or turn on a reservation system, an indication to view reservation information, an indication to view waiting list information, an indication to view table information, an indication to view server information, or an indication to view guest information.

Contact information box 808 comprises data entry fields for entering waiting list entry contact information. In the example shown, contact information box 808 comprises a last name box, a first name box, and a phone number box. In some embodiments, the interface stores guest contact information when a reservation or waiting list entry is made, allowing automatic completion of that guest's contact information for future reservations or waiting list entries. In some embodiments, contact information box 808 additionally includes a pop-up menu of known guests, such that a restaurant employee can select a guest from the menu and have the contact information automatically entered into the data entry fields.

Reservation notes and codes box 810 comprises data entry fields for reservation notes and reservation codes. The reservation notes data entry field comprises an unstructured text box for entering notes related to the waiting list entry. The reservation codes data entry field comprises a box for entering reservation codes selected from a list of typical reservation codes (e.g., quiet table, anniversary, etc.). In the example shown, waiting list entries use the same reservation notes and codes interface as is used when creating a new reservation (e.g., in reservation notes and codes box 310 of FIG. 3), however, an equivalent guest notes and codes field (e.g., to guest notes and codes box 312 of FIG. 3) is not present in the waiting list entry creation interface.

Figure 9A:
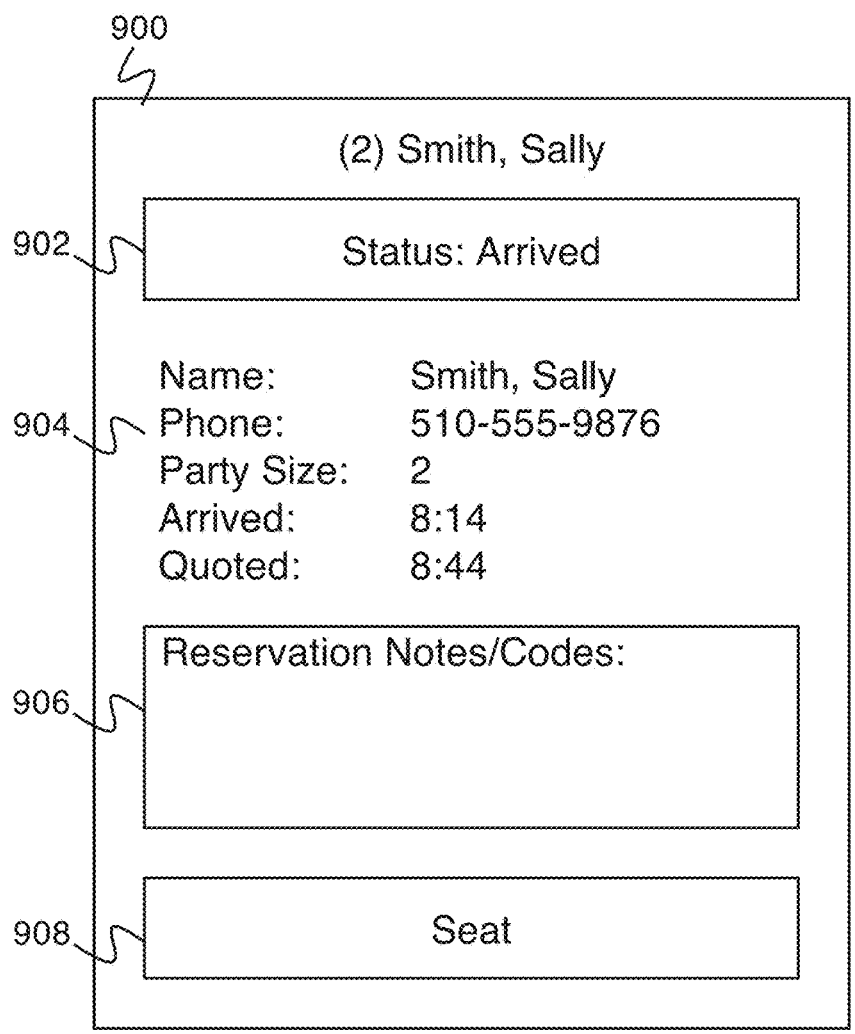
FIG. 9A is a diagram illustrating a waiting list entry data window in a graphical user interface of a restaurant management system.

FIG. 9A is a diagram illustrating a waiting list entry data window in a graphical user interface of a restaurant management system. In some embodiments, waiting list entry data window 900 is accessed by selecting a waiting list entry from a waiting list (e.g., from list box 704 of FIG. 7). In some embodiments, waiting list entry data window 900 is displayed as a pop-up window superimposed on the graphical user interface of FIG. 7. In the example shown, waiting list entry data window 900 shows the party size and name associated with the waiting list entry to quickly identify the waiting list entry to a restaurant management system user. Status box 902 shows the current status of the waiting list entry (e.g., partially arrived, arrived, etc.). In some embodiments, status box 902 displays a color along with the text status for easier viewing. Selecting status box 902 takes the restaurant management system user to a change status window where a status can be selected. Details section 904 displays reservation details (e.g., name, phone number, party size, waiting time, etc.). Selecting the reservation details shown in details section 904 allows the details to be modified (e.g., in the event of a party size change). Reservation notes and codes section 906 displays reservation notes and codes entered when the waiting list entry was created. Selecting reservation notes and codes box 906 takes the restaurant management system user to a change reservation notes and codes window where reservation notes and codes can be changed. Seat button 908 allows the reservation management system user to seat the party, updating the status of the party and the table the party is seated at within the reservation management system. In some embodiments, the seat button takes the restaurant employee to a table selection interface (e.g., the table selection interface of FIG. 4) to determine where to seat the party.

FIG. 9B is a diagram illustrating a waiting list entry data window in a graphical user interface of a restaurant management system. In some embodiments, waiting list entry data window 950 is accessed by selecting a waiting list entry from a waiting list (e.g., from list box 704 of FIG. 7). In some embodiments, waiting list entry data window 950 comprises waiting list entry data window 900 of FIG. 9A including a table box and an estimated seating time display. In the example shown, table box 952 comprises a table entry box for entering a desired table to seat the waiting list entry. In various embodiments, the desired table is determined by a restaurant employee without assistance from the interface, and entered into table box 952 using a keypad, a number pad, a reservation table selector window, a dial meter, or any other appropriate method. In some embodiments, selecting table box 952 brings up a table selection interface (e.g., the table selection interface of FIG. 4) for selecting a table for the wait list entry. When a desired table has been entered into table box 952, estimated seating time display 954 displays an estimated seating time to seat the associated party at the desired table. In some embodiments, a suggested table is displayed or a next suggested table (e.g., after rejecting the originally suggested table). In some embodiments, the system calculates an estimated seating time based on existing tables and estimated completion times, combinations and permutations of reservations and estimated completion times, and criteria for modeling the wait (e.g., optimizing wait, turnover, profitability, staff usage, etc.).

Figure 10A:
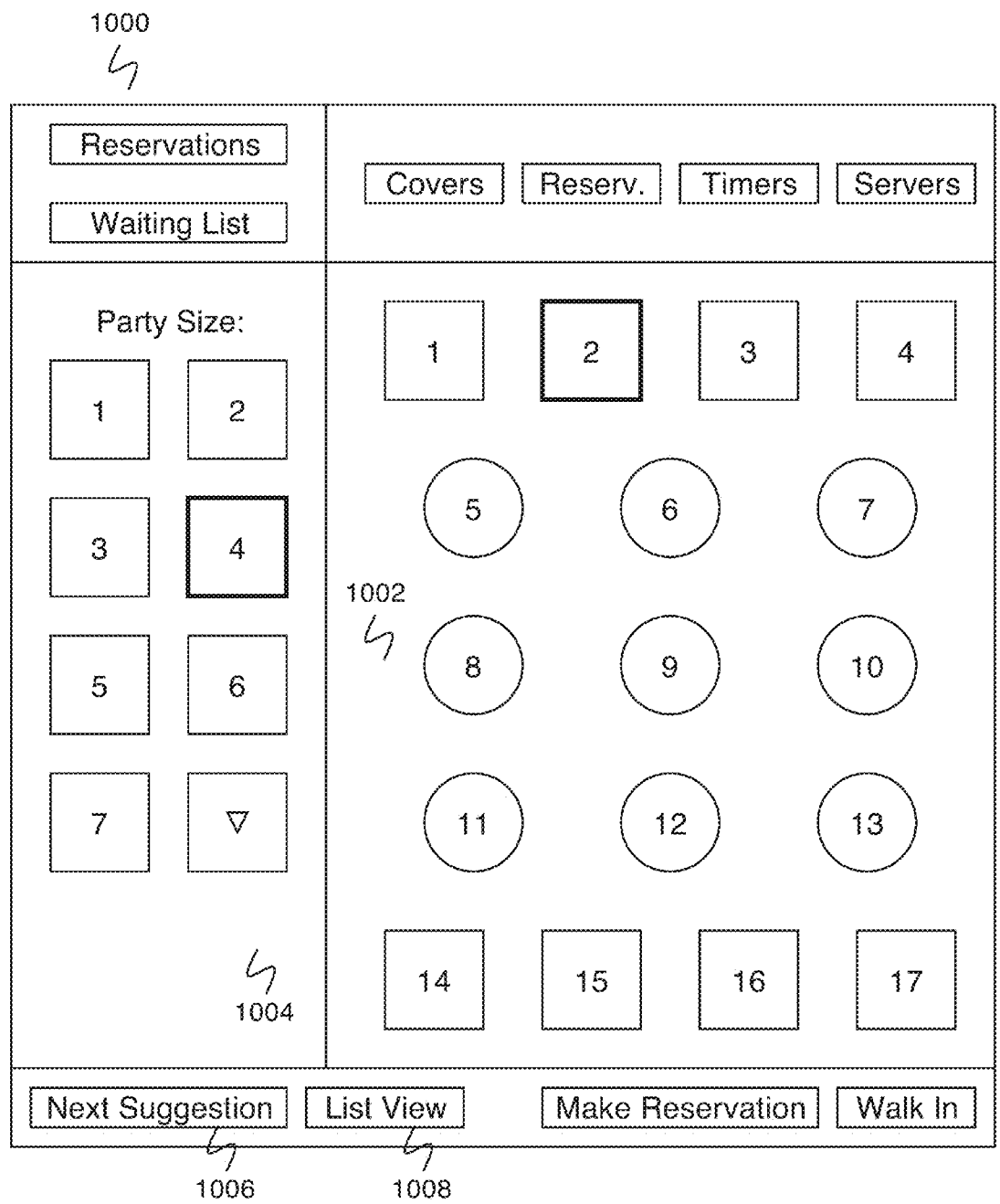
FIG. 10A is a diagram illustrating an embodiment of a graphical user interface including a map table suggestion interface in a restaurant management system.

FIG. 10A is a diagram illustrating an embodiment of a graphical user interface including a map table suggestion interface in a restaurant management system. In some embodiments, the graphical user interface of FIG. 10A comprises the graphical user interface of FIG. 2A in a table selection mode. In some embodiments, the table suggestion interface is accessed by selecting a table suggestions box (e.g., the table suggestions box of seating functions box 210 of FIG. 2A). In the example shown, graphical user interface 1000 comprises party size box 1004, which displays a party size selector enabling a restaurant employee to select the party size for which the table suggestions are to be made. Graphical user interface 1000 additionally comprises map box 1002, which displays a map of tables in the restaurant. Map box 1002 indicates a table to the restaurant employee as a suggested table (e.g., the table marked as table 2). In various embodiments, the suggested table is indicated using a flashing, a color, a shading, an outline, an arrow, a box, or any other appropriate indicator. In some embodiments, the suggested table is selected from a list of suggested tables. The graphical user interface additionally comprises next suggestion box 1006. A restaurant employee can see a different suggested table by selecting next suggestion box 1006. In some embodiments, when graphical user interface 1000 is accessed, a list of suggested tables is accessed, and the first table on the list is indicated as the suggested table. If next suggestion box 1006 is selected, the next selection from the list of suggested tables is indicated. In some embodiments, the list of suggested tables is created by the restaurant management system in real time when graphical user interface 1000 is accessed, in response to the time, the party size, the current restaurant situation, the current restaurant reservations, and any other appropriate factors. The graphical user interface additionally comprises list view button 1008 for viewing the table suggestion interface as a list table suggestion interface instead of a map table suggestion interface.

FIG. 10B is a diagram illustrating an embodiment of a graphical user interface including a list table suggestion interface in a restaurant management system. In some embodiments, the graphical user interface of FIG. 10B comprises the graphical user interface of FIG. 2A in a table selection mode. In some embodiments, the table suggestion interface is accessed by selecting a table suggestions box (e.g., the table suggestions box of seating functions box 210 of FIG. 2A). In some embodiments the list table suggestion interface is accessed by selecting a list view button (e.g., list view button 1008 of FIG. 10A). Graphical user interface 1050 comprises party size box 1054, which displays a party size selector enabling a restaurant employee to select the party size for which the table suggestions are being made. Graphical user interface 1050 additionally comprises list box 1052, which displays a list of suggested tables. In some embodiments, when graphical user interface 1050 is accessed, a list of suggested tables is accessed, and the list is displayed in list box 1052. In some embodiments, the list of suggested tables is created by the restaurant management system in real time when graphical user interface 1050 is accessed, in response to the time, the party size, the current restaurant situation, the current restaurant reservations, and any other appropriate factors. Map view button 1056 toggles the display to map view.

In some embodiments, the suggested seating table can be overridden, using direct assignment, by the restaurant user. A directly assigned table may violate certain seating rules, such as causing two reservations to be assigned to the same table. In some embodiments, a directly assigned reservation that causes seating rules violations can be password protected to prevent unauthorized users from assigning the party over the rules. In some embodiments, a directly assigned reservation that causes seating rules violation will cause a warning and provide one or more suggestions to resolve the violations. The suggestions to resolve may include automatically moving other reservations to suitable tables, as calculated by the system using the seating priority rules.

Figure 11:
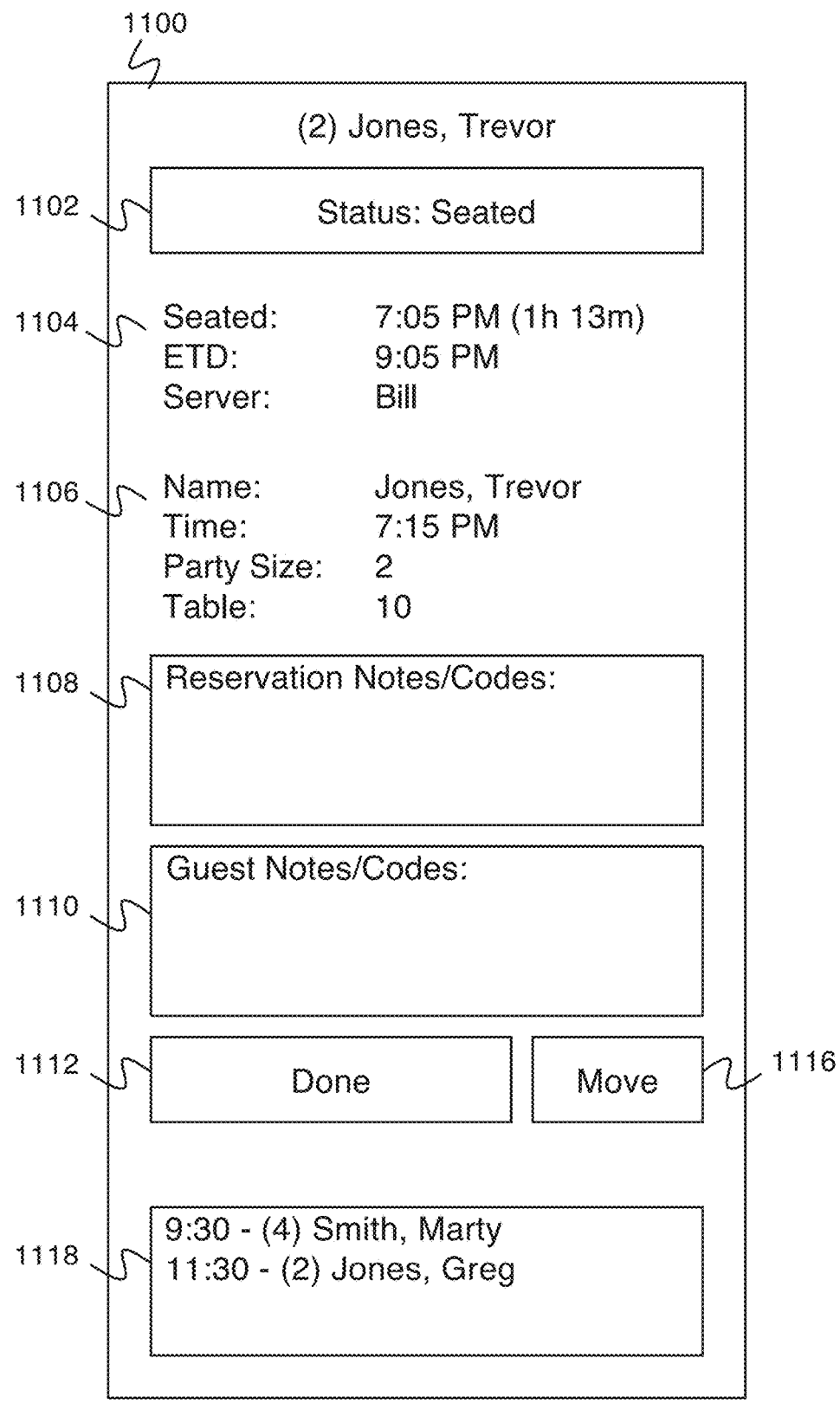
FIG. 11 is a diagram illustrating an embodiment of a table data window for an occupied table in a graphical user interface of a restaurant management system.

FIG. 11 is a diagram illustrating an embodiment of a table data window for an occupied table in a graphical user interface of a restaurant management system. In some embodiments, table data window 1100 is accessed by selecting an occupied table from a table map (e.g., map box 208 of FIG. 2A). In some embodiments, table data window 1100 is displayed as a pop-up window superimposed on the graphical user interface of FIG. 2A. In the example shown, table data window 1100 shows the party size and name associated with the table to quickly identify the table to a restaurant management system user. Status box 1102 shows the current status of the table (e.g., seated, entrée, dessert, paid, etc.). In some embodiments, status box 1102 includes a colored indicator for indicating the status associated with the table. In some embodiments, status box 1102 comprises a button for changing the status associated with the table. In some embodiments, selecting status box 1102 toggles the status to a next state. In some embodiments, selecting status box 1102 takes the restaurant management system user to a change status window where a status can be selected. Seated table details section 1104 displays seated table details (e.g., time party was seated, duration party has been seated, estimated time the party will be done, table server, etc.). In some embodiments, the indicator of the duration the party has been seated comprises a floor timer. In some embodiments, changing the table status (e.g., using status box 1102) toggles the floor timer status. Selecting the table details shown in table details section 1104 allows the details to be modified. In some embodiments, the floor timer display comprises a button for toggling the floor timer status. Party details section 1106 displays party details (e.g., name, time, party size, table, etc.). Selecting the party details shown in party details section 1106 allows the details to be modified. Reservation notes and codes box 1108 displays reservation notes and codes. Selecting reservation notes and codes box 1108 takes the restaurant management system user to a change reservation notes and codes window where reservation notes and codes can be changed. Guest notes and codes section 1110 displays guest notes and codes. Selecting guest notes and codes box 1110 takes the restaurant management system user to a change guest notes and codes window where guest notes and codes can be changed. Done button 1112 allows the reservation management system user to indicate the party is done, updating the status of the party and the table the party is seated at within the reservation management system. Move button 1116 takes the restaurant management system user to a table selection interface (e.g., the table selection interface shown in FIG. 4), allowing the restaurant management system user to assign the seated party to a different table. Future reservations box 1118 indicates future reservations at the current table. In some embodiments, selecting a reservation from future reservations box 1118 brings up a reservation data window (e.g., reservation data window 500 of FIG. 5) corresponding to the selected reservation.

Figure 12:
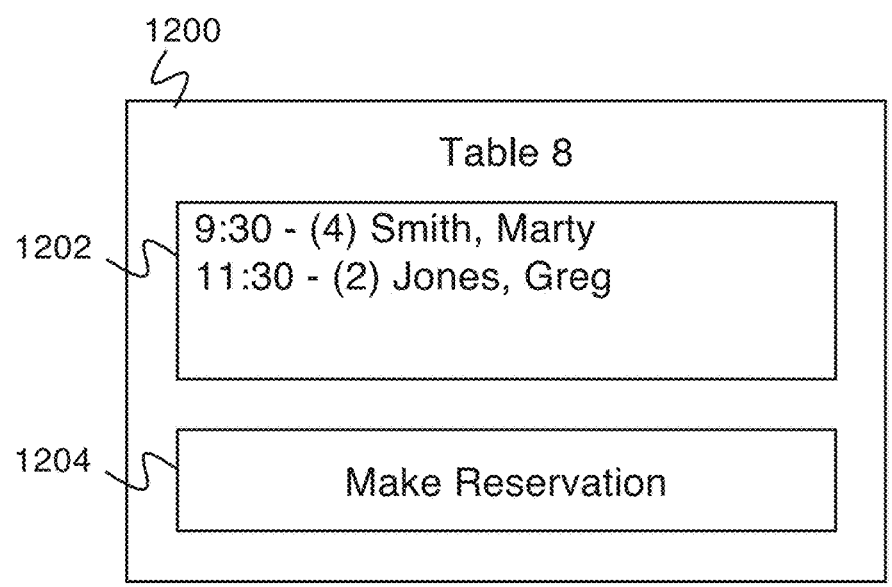
FIG. 12 is a diagram illustrating an embodiment of a table data window for an empty table in a graphical user interface of a restaurant management system.

FIG. 12 is a diagram illustrating an embodiment of a table data window for an empty table in a graphical user interface of a restaurant management system. In some embodiments, table data window 1200 is accessed by selecting an empty table from a table map (e.g., map box 208 of FIG. 2A). In some embodiments, table data window 1200 is displayed as a pop-up window superimposed on the graphical user interface of FIG. 2A. In the example shown, table data window 1200 shows the table number associated with the table (e.g., Table 8) to quickly identify the table to a restaurant management system user. Future reservations box 1202 indicates future reservations at the current table. In some embodiments, selecting a reservation from future reservations box 1202 brings up a reservation data window (e.g., reservation data window 500 of FIG. 5) corresponding to the selected reservation. Make reservation box 1204 accesses a make reservation window (e.g., make reservation window 300 of FIG. 3). In some embodiments, when make reservation box 1204 is used to access a make reservation window, the make reservation window appears with the table number (e.g., Table 8) automatically entered in the table box (e.g., the table box of reservation information box 306 of FIG. 3).

Figure 13:
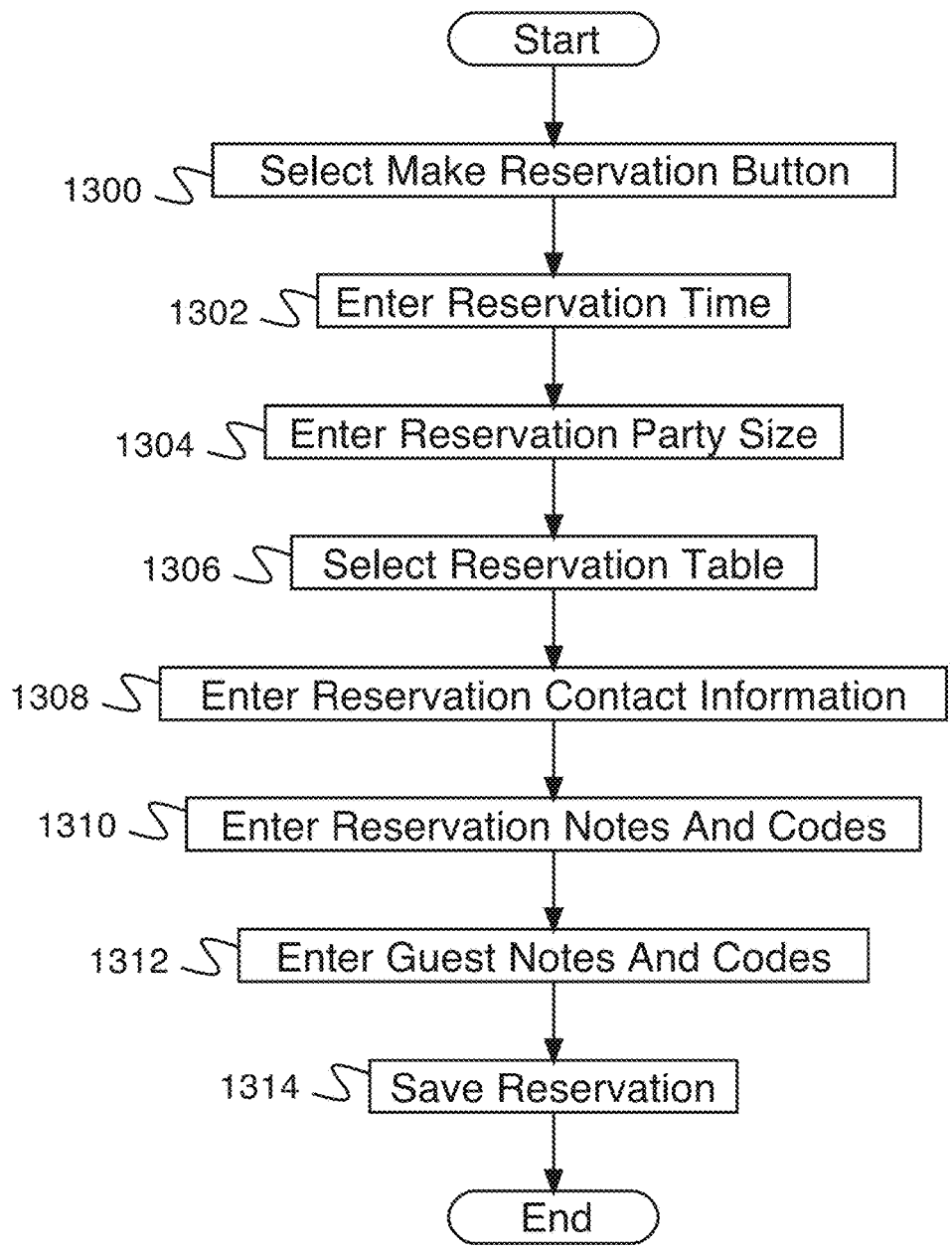
FIG. 13 is a flow diagram illustrating an embodiment of a process for creating a reservation.

FIG. 13 is a flow diagram illustrating an embodiment of a process for creating a reservation. In some embodiments, the process of FIG. 13 is executed by a restaurant employee interacting with a restaurant management system client (e.g., restaurant management system client 104 of FIG. 1 or restaurant management system client 106 of FIG. 1), through a graphical user interface (e.g., graphical user interface 200 of FIG. 2A). In the example shown, in 1300, the make reservation button (e.g., the make reservation button of seating functions box 210 of FIG. 2A) is selected. In some embodiments, selecting the make reservation button causes a make reservation window (e.g., make reservation window 300 of FIG. 3) to appear. In 1302, the reservation time is entered (e.g., into the time box of reservation information box 306 of FIG. 3). In 1304, the reservation party size is entered (e.g., into the party size box of reservation information box 306 of FIG. 3). In 1306, the reservation table is selected. In some embodiments, selecting the reservation table comprises entering it into a reservation table box (e.g., into the reservation table box of reservation information box 306 of FIG. 3). In some embodiments, the reservation table is selected using a graphical user interface including a table selection interface (e.g., graphical user interface 400 of FIG. 4). In some embodiments, selecting a reservation table comprises accepting a reservation table suggestion. In some embodiments, a reservation table is not selected (e.g., table is assigned at seating time). In 1308, reservation contact information is entered (e.g., into reservation contact information box 308 of FIG. 3). In 1310, reservation notes and codes are entered (e.g., into reservation notes and codes box 310 of FIG. 3). In 1312, guest notes and codes are entered (e.g., into guest notes and codes box 312 of FIG. 3). In 1314, the reservation is saved (e.g., using save button 304 of FIG. 3).

Figure 14:
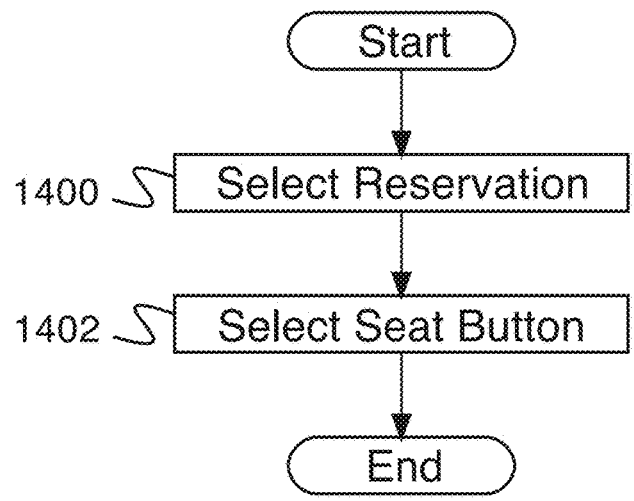
FIG. 14 is a flow diagram illustrating an embodiment of a process for seating a reservation.

FIG. 14 is a flow diagram illustrating an embodiment of a process for seating a reservation. In some embodiments, the process of FIG. 14 is executed by a restaurant employee interacting with a restaurant management system client (e.g., restaurant management system client 104 of FIG. 1 or restaurant management system client 106 of FIG. 1), through a graphical user interface (e.g., graphical user interface 200 of FIG. 2A). In the example shown, in 1400, the reservation is selected (e.g., from the list of reservations displayed in list box 206 of FIG. 2A). In some embodiments, selecting a reservation causes a reservation data window (e.g., reservation data window 500 of FIG. 5) to be displayed. In 1402 the seat button (e.g., seat button 512 of FIG. 5) is selected.

Figure 15:
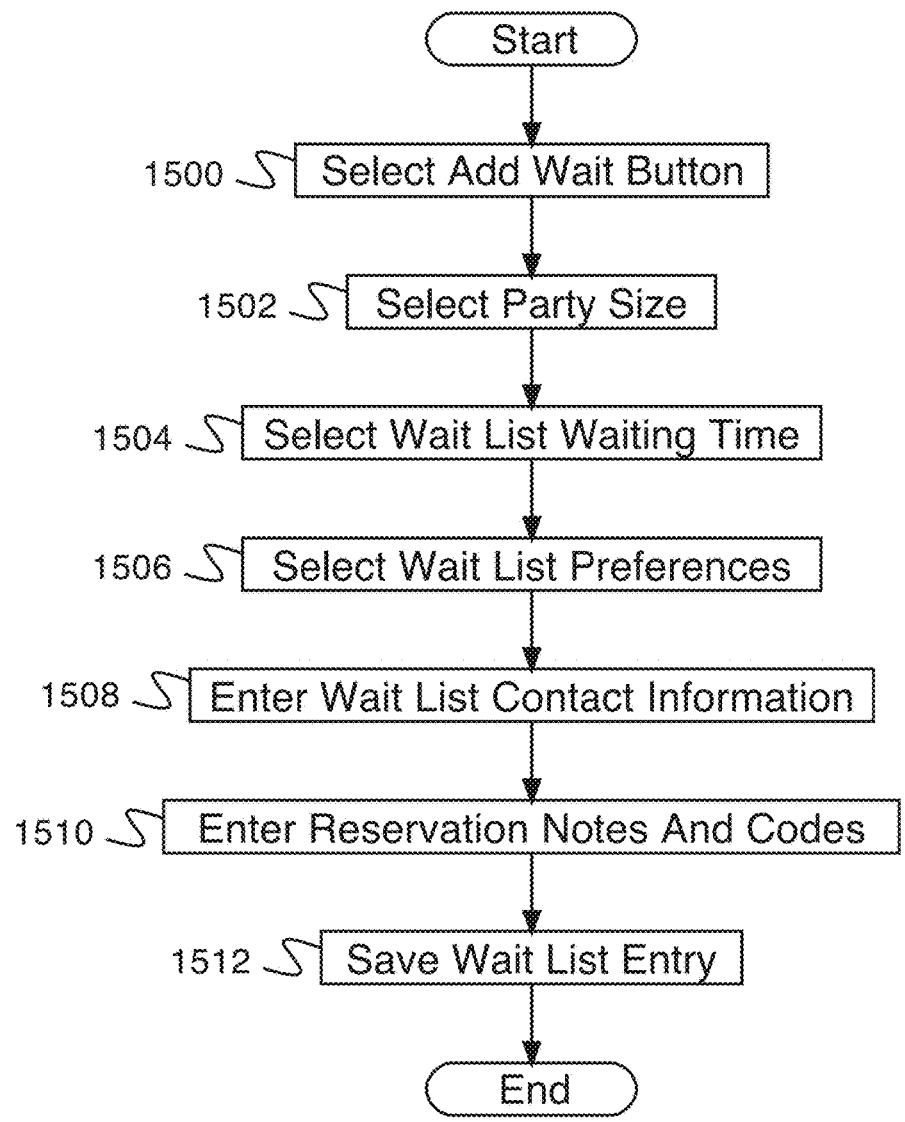
FIG. 15 is a flow diagram illustrating an embodiment of a process for creating a wait list entry.

FIG. 15 is a flow diagram illustrating an embodiment of a process for creating a wait list entry. In some embodiments, the process of FIG. 15 is executed by a restaurant employee interacting with a restaurant management system client (e.g., restaurant management system client 104 of FIG. 1 or restaurant management system client 106 of FIG. 1), through a graphical user interface (e.g., graphical user interface 200 of FIG. 2A). In the example shown, in 1500, an add wait button is selected (e.g., an add wait button as described in the section regarding FIG. 2A). In some embodiments, a walk in button (e.g., the walk in button of seating functions box 210 of FIG. 2A) is selected instead of a walk in button. In some embodiments, an add wait list entry window (e.g., add wait list entry window 800 of FIG. 8) is displayed in response to selection of the add wait button or the walk in button. In 1502, the party size is selected (e.g., using the party size selector of waiting list entry information box 806 of FIG. 8). In 1504, the wait list waiting time is selected (e.g., using the waiting time selector of waiting list entry information box 806 of FIG. 8). In some embodiments, the wait list waiting time is automatically determined by the restaurant management system and entered in the waiting time selector in response to the party size selection (e.g., the party size selection in 1502). In some embodiments, a desired table is selected for an entry in the waiting list, the estimated waiting time for the party associated with the entry in the waiting list to be seated at the desired table is displayed. In some embodiments, the waiting time is estimated given the selected desired table and calculated using the possible combinations of the earlier reservations in the waiting list and the possibility of these earlier wait listed reservations being seated at that desired table. In various embodiments, in the event that the selected desired table is known, the suggested table calculated for other reservations is made to avoid seating at the desired table, is made to reduce the possibility of seating at the desired table, is made to have no difference in the suggestions for tables of earlier reservations or waiting list entries, or any other appropriate influence on the suggested table calculation. In 1506, wait list preferences are selected (e.g., using the requests box and preferred table box of waiting list entry information box 806 of FIG. 8). In 1508, wait list contact information is entered (e.g., into contact information box 808 of FIG. 8). In 1510, reservation notes and codes are entered (e.g., into reservation notes and codes box 810 of FIG. 8). In 1512, the wait list entry is saved (e.g., using save button 804 of FIG. 8).

Figure 16:
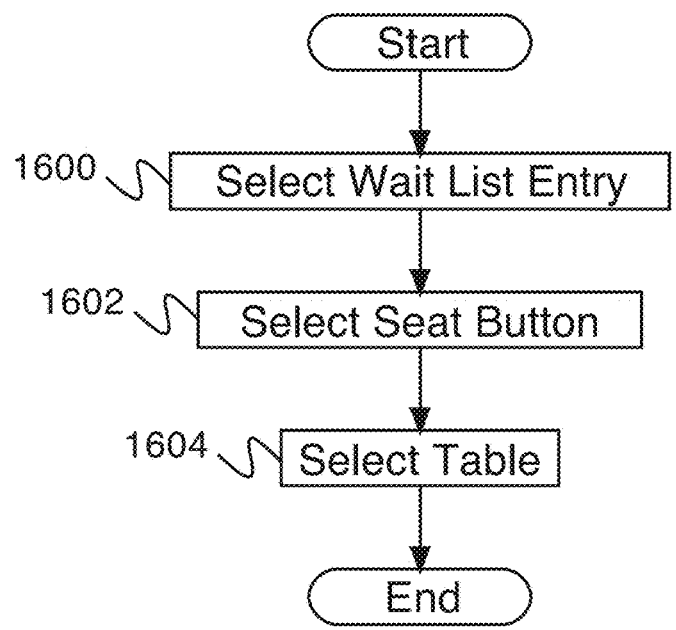
FIG. 16 is a flow diagram illustrating an embodiment of a process for seating a wait list entry.

FIG. 16 is a flow diagram illustrating an embodiment of a process for seating a wait list entry. In some embodiments, the process of FIG. 16 is executed by a restaurant employee interacting with a restaurant management system client (e.g., restaurant management system client 104 of FIG. 1 or restaurant management system client 106 of FIG. 1), through a graphical user interface (e.g., graphical user interface 700 of FIG. 7). In the example shown, in 1600, the wait list entry is selected (e.g., from the list of wait list entries displayed in list box 704 of FIG. 7). In some embodiments, selecting a wait list entry causes a wait list entry data window (e.g., waiting list entry data window 900 of FIG. 9A) to be displayed. In 1602, the seat button (e.g., seat button 908 of FIG. 9A) is selected. In 1604, the table to seat the party at is selected. In some embodiments, the table is selected using a graphical user interface including a table selection interface (e.g., graphical user interface 400 of FIG. 4). In some embodiments, a desired table is selected for an entry in the waiting list, the estimated waiting time for the party associated with the entry in the waiting list to be seated at the desired table is displayed.

Figure 17:
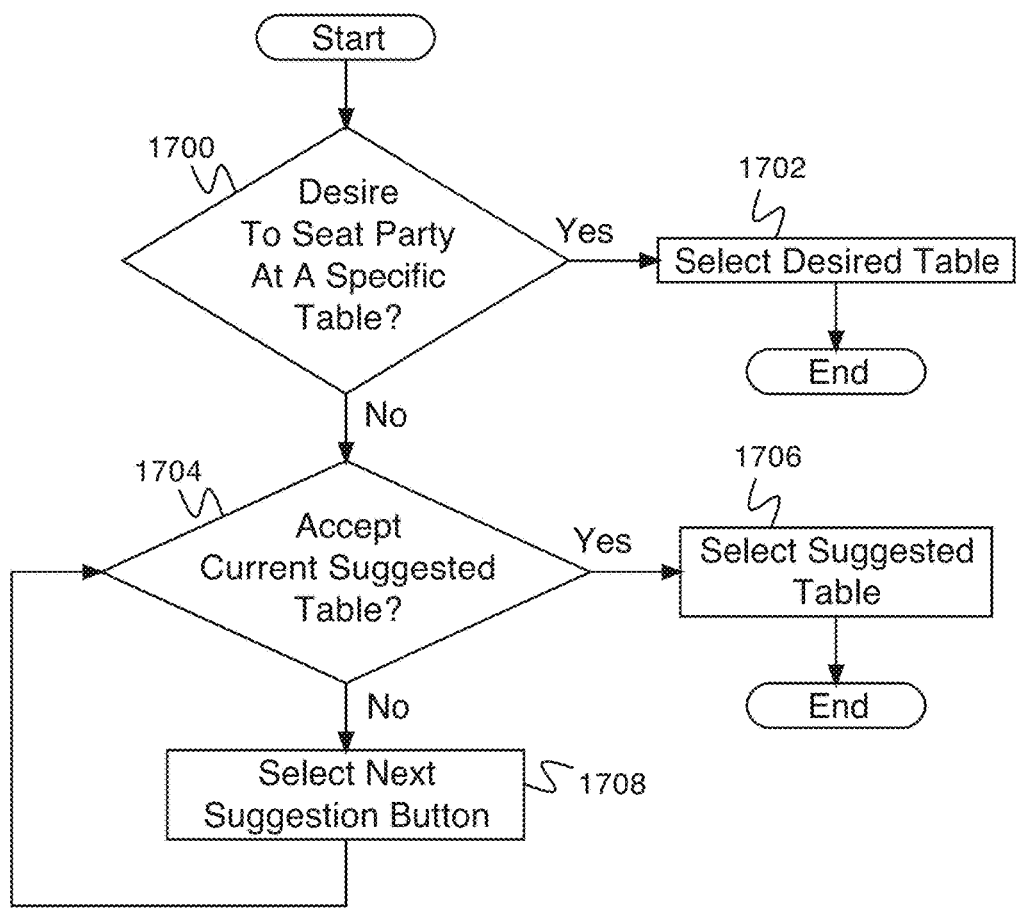
FIG. 17 is a flow diagram illustrating a process for selecting a table.

FIG. 17 is a flow diagram illustrating a process for selecting a table. In some embodiments, the process of FIG. 17 is executed by a restaurant employee interacting with a restaurant management system client (e.g., restaurant management system client 104 of FIG. 1 or restaurant management system client 106 of FIG. 1), through a graphical user interface including a table selection interface (e.g., graphical user interface 400 of FIG. 4). In some embodiments, the process of FIG. 17 implements 1306 of the reservation creation process of FIG. 13. In some embodiments, the process of FIG. 17 implements 1604 of the wait list seating process of FIG. 16. In the example shown, in 1700, the employee determines whether he desires to seat the party at a particular table. For instance, the employee may know that the guest prefers a particular table, may desire to put more people in a particular area of the restaurant, may desire to seat two parties near one another, or may have any other reason for a desire to seat the party at a specific table. If the employee determines in 1700 that he desires to seat the party at a particular table, control passes to 1702. In 1702, the employee selects the desired table (e.g., by selecting the table on map 402 of FIG. 4), and the process ends. If the employee determines in 1700 that he does not desire to seat the party at a particular table, control passes to 1704. In 1704, the employee determines whether he wants to accept the currently suggested table. If the employee determines in 1704 that he wants to accept the currently suggested table, control passes to 1706. In 1706, the employee selects the suggested table (e.g., by selecting the table on map 402 of FIG. 4), and the process ends. If the employee determines in 1704 that he does not to accept the current suggested table, control passes to 1708. In 1708, the employee selects the next suggestion button (e.g., next suggestion button 404 of FIG. 4). Control then returns to 1704. In some embodiments, the employee can select a table if a suggested table or tables are not desired.

Figure 18:
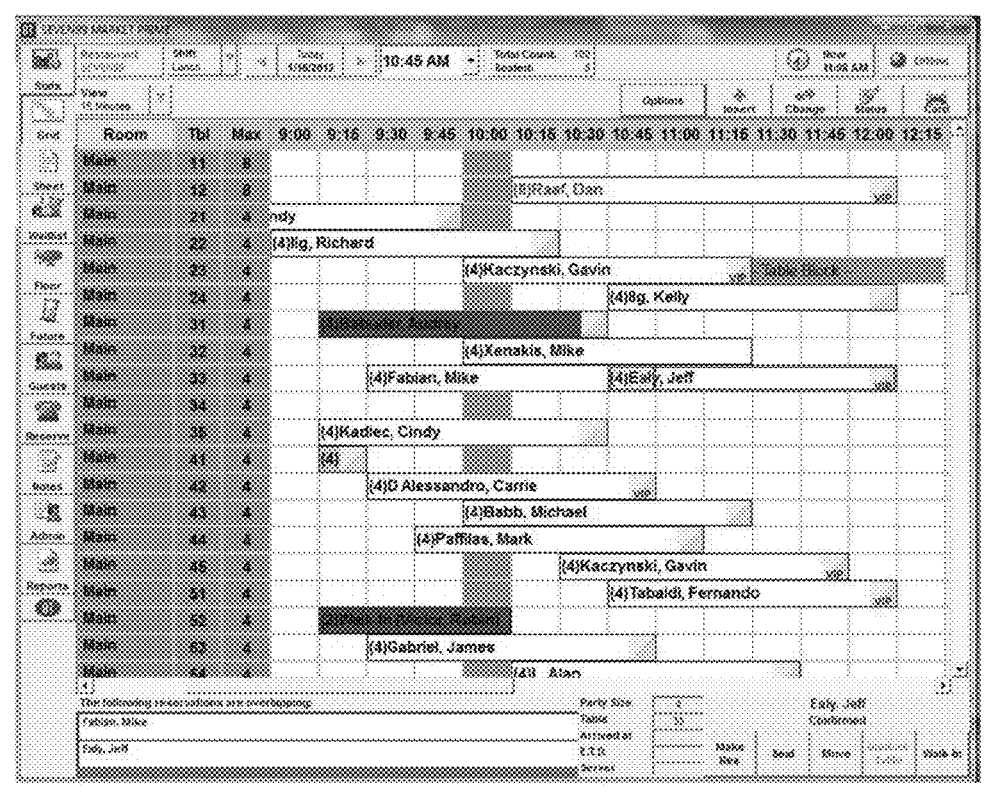

FIG. 18 is a block diagram illustrating an embodiment of a screen shot of a grid view for viewing reservations. In the example shown, the view shows a summary of all reservations and waitlist guests in a grid organized by time (e.g., columns) and table number (e.g., rows). Reservations appear with the guest's name, party size, status color, and recognition code(s). Overlapped reservations are indicated with hash marks in the overlapping time (e.g., table 33 at 10:45, there is an overlap between Mike Fabian party of 4 and Jeff Ealy party of 4). The grid also displays times that are not available (e.g., along the 10:00 time column). In various embodiments, the reasons for times not being available are pacing limit exceeded, table blocks, manager blocks, advanced seating blocks, first/last seating settings, or any other appropriate reasons.

Figure 19:
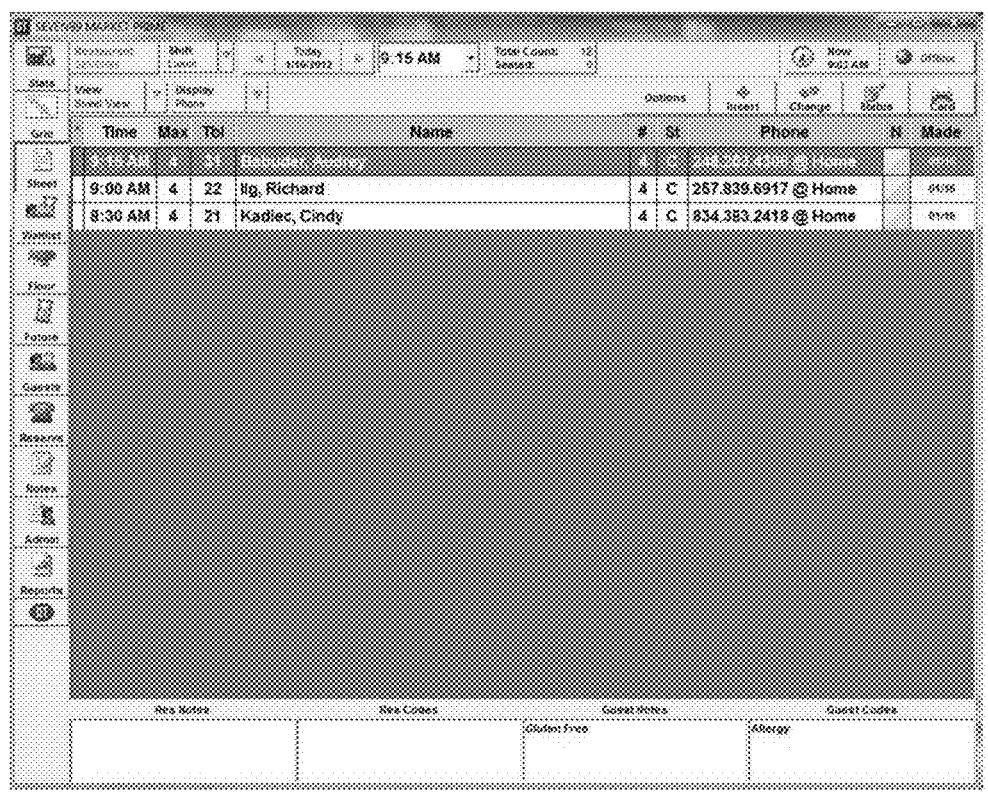
FIG. 19 is a block diagram illustrating an embodiment of a screen shot of a sheet view for viewing reservations.

FIG. 19 is a block diagram illustrating an embodiment of a screen shot of a sheet view for viewing reservations. In the example shown, the view shows a summary of all reservations in a list view. The list is sortable by time, table, name, party size (e.g., number), maximum party size, status (e.g., confirmed), time made, VIP status, and phone number.

Figure 20:
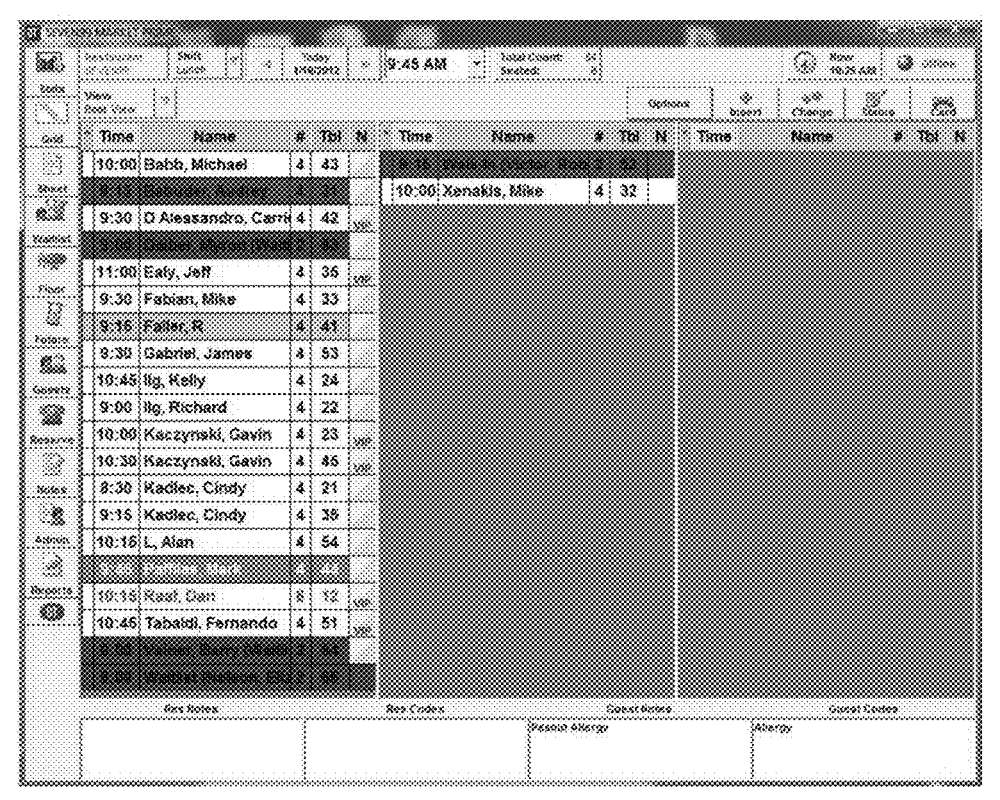

FIG. 20 is a block diagram illustrating an embodiment of a screen shot of a book view for viewing reservations. In the example shown, the view shows a summary of all reservations in a three column list view. In various embodiments, the three columns each show reservation time, name, party size, table number, very important person status (e.g., VIP), or any other relevant reservation column.

Figure 21:
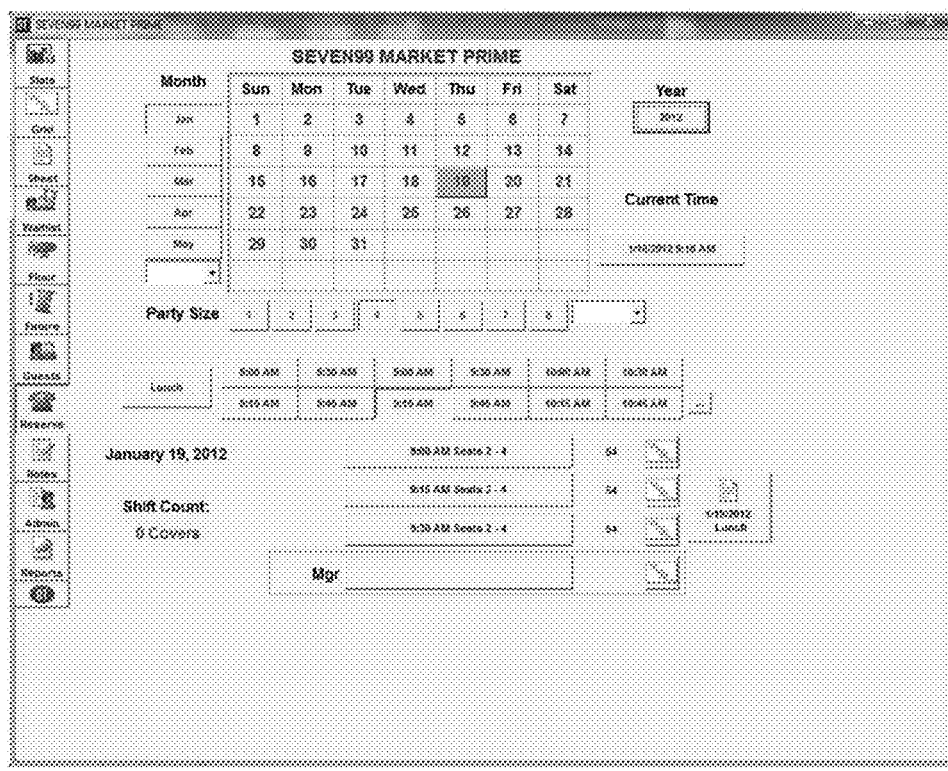
FIG. 21 is a block diagram illustrating an embodiment of a screen shot of a reserve view for making a reservation.

FIG. 21 is a block diagram illustrating an embodiment of a screen shot of a reserve view for making a reservation. In the example shown, the view shows a screen for quickly making a reservation by selecting the desired date, time, and party size of the reservation. The system shows the best available table for the reservation based on an availability algorithm designed to maximize seating in the restaurant. The system also shows table combinations. The system shows available times near the requested time. The system shows a first available time if no times are available near the requested time. The system shows manager availability.

Figure 22:
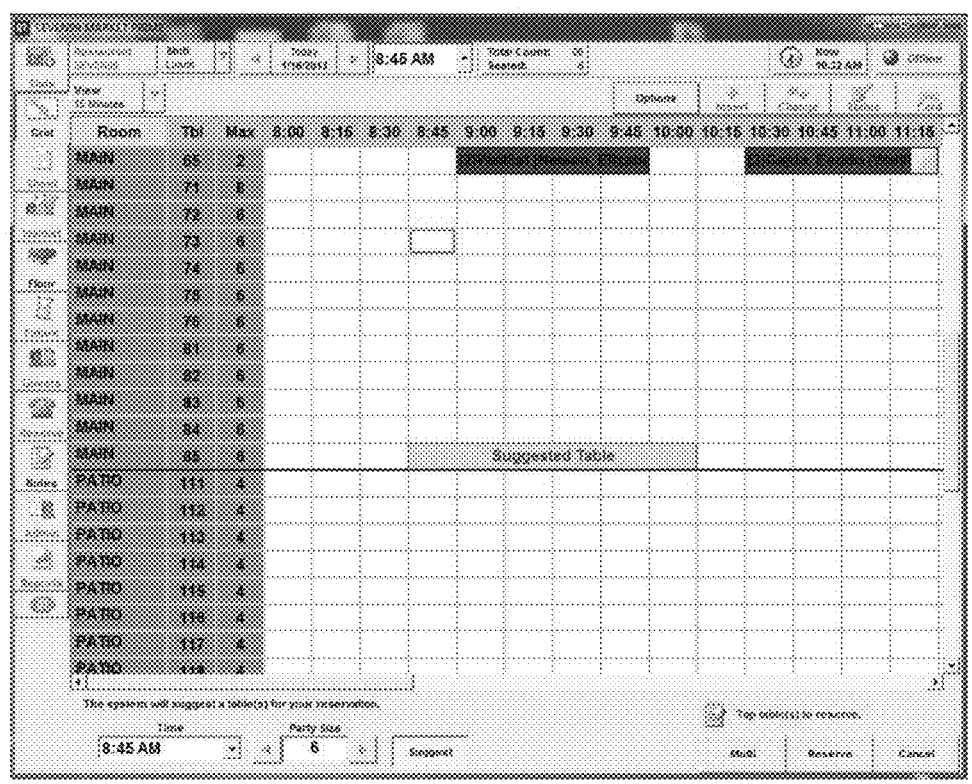
FIG. 22 is a block diagram illustrating an embodiment of a screen shot of a grid view for making a reservation.

FIG. 22 is a block diagram illustrating an embodiment of a screen shot of a grid view for making a reservation. In the example shown, the view shows a screen for quickly making a reservation by selecting time and party size of the reservation. The system shows the best available table for the reservation based on an availability algorithm designed to maximize seating in the restaurant. The system also shows table combinations.

Figure 23:
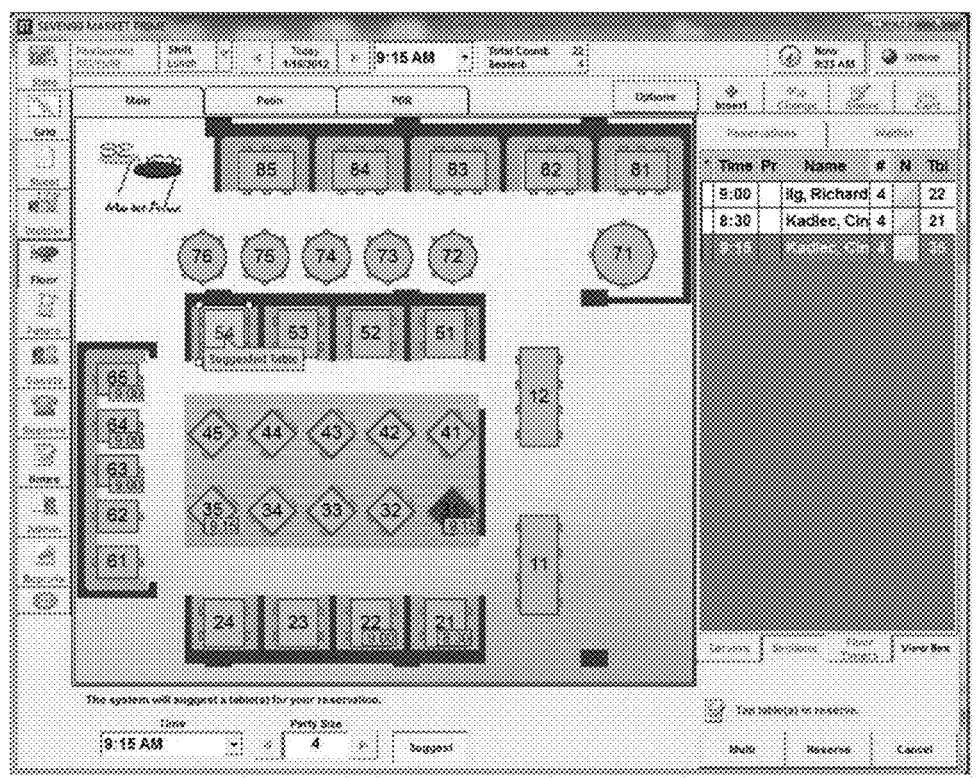
FIG. 23 is a block diagram illustrating an embodiment of a screen shot of a floor view for making a reservation.

FIG. 23 is a block diagram illustrating an embodiment of a screen shot of a floor view for making a reservation. In the example shown, the view shows a screen for quickly making a reservation by selecting time and party size of the reservation. The system shows the best available table for the reservation based on an availability algorithm designed to maximize seating in the restaurant. The system also shows table combinations.

Figure 24:
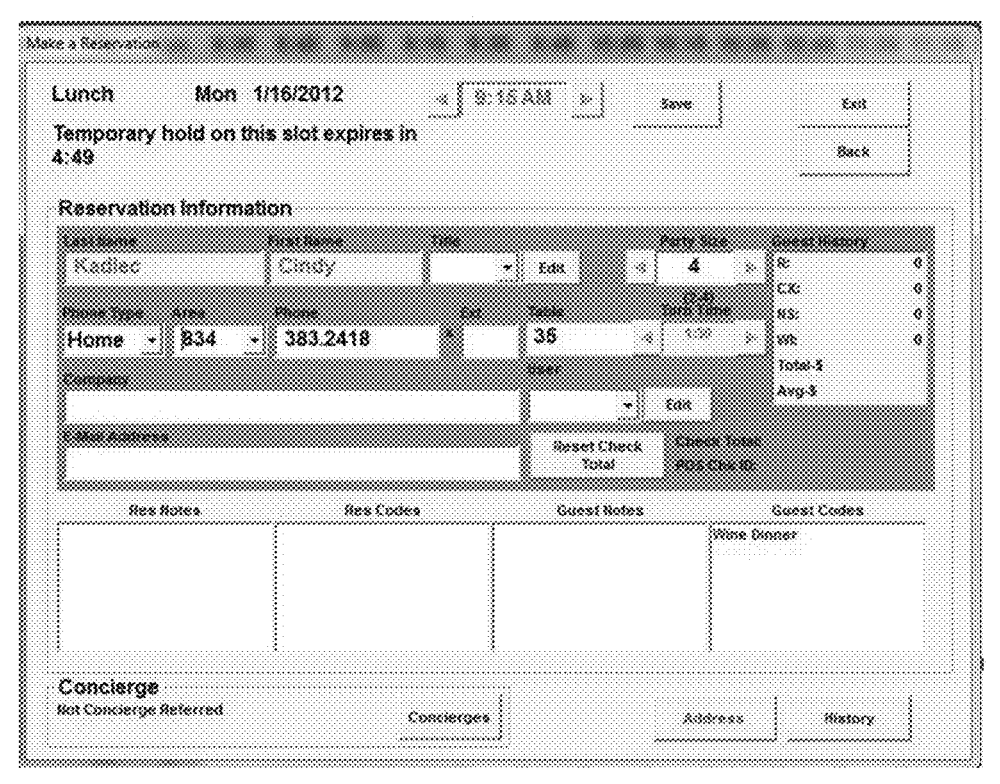

FIG. 24 is a block diagram illustrating an embodiment of a screen shot of a dialog view for making a reservation. In the example shown, the screen enables entering key information about the guest and the reservation. The screen shows a view of a summary of a guest history. The view enables modification of turn times. In some embodiments, the view shows guest's spend history (e.g., if the point of sale integration is enabled). The screen enables guest and reservation notes and codes to be viewed or modified. The screen enables a user to be able to put a temporary hold on the availability so that it does not get booked by another user.

Figure 25:
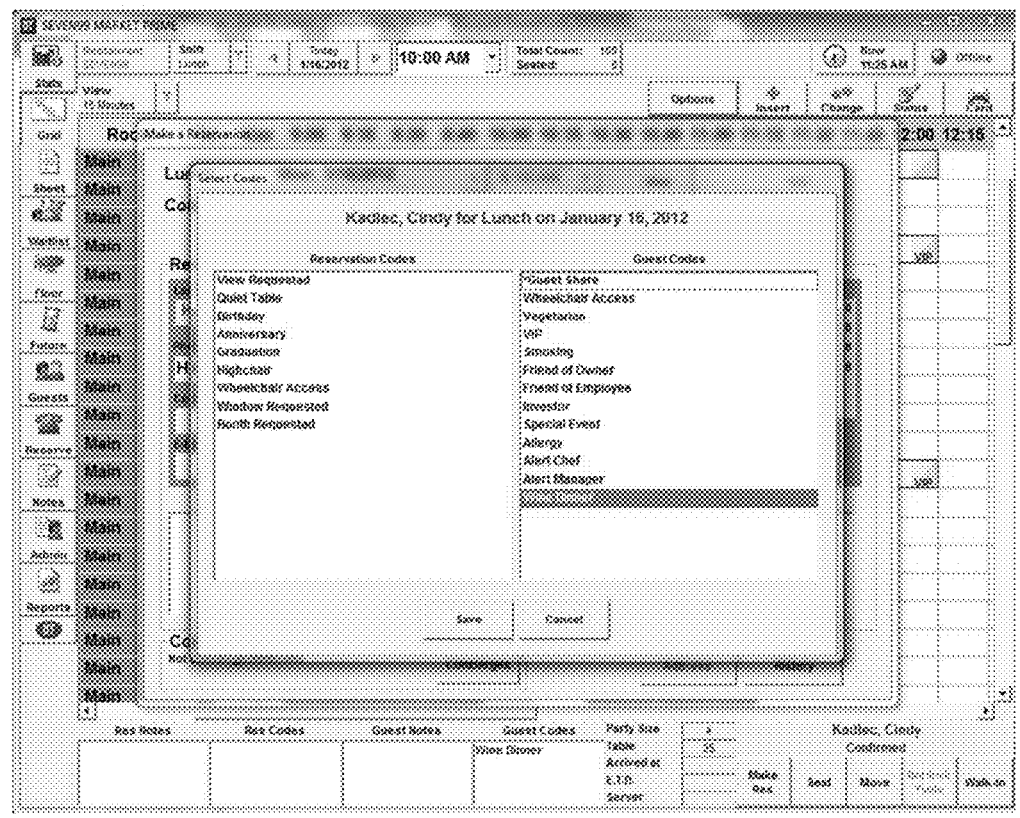
FIG. 25 is a block diagram illustrating an embodiment of a screen shot for adding/modifying a guest notes and/or codes.

FIG. 25 is a block diagram illustrating an embodiment of a screen shot for adding/modifying guest notes and/or codes. In the example shown, the screen enables a user to add reservation and guest codes from a custom list of codes. The guest codes are retained in a database and associated with the guest. Reservation codes are retained in the database and associated with the reservation.

Figure 26:
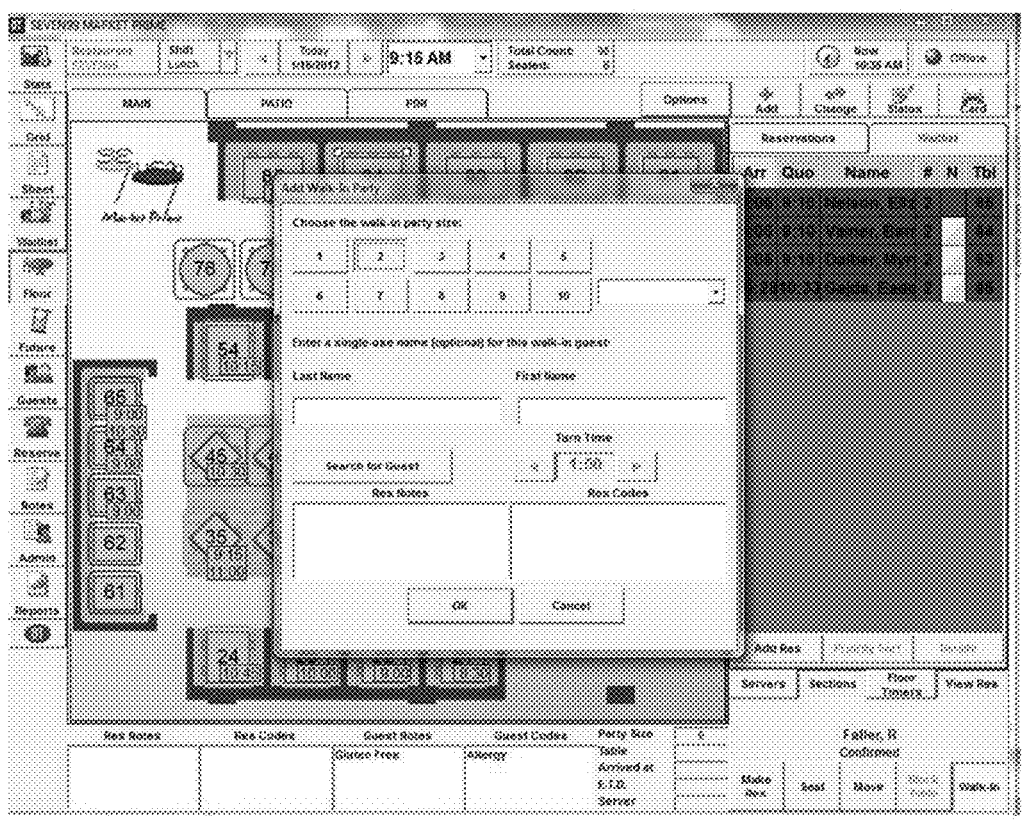

FIG. 26 is a block diagram illustrating an embodiment of a screen shot for adding a walk-in. In the example shown, the screen enables adding a walk-in guest by selecting the party size. A user has the option to enter a single name or search for the guest in the database. A user is also enabled to add a new guest to the database.

Figure 27:
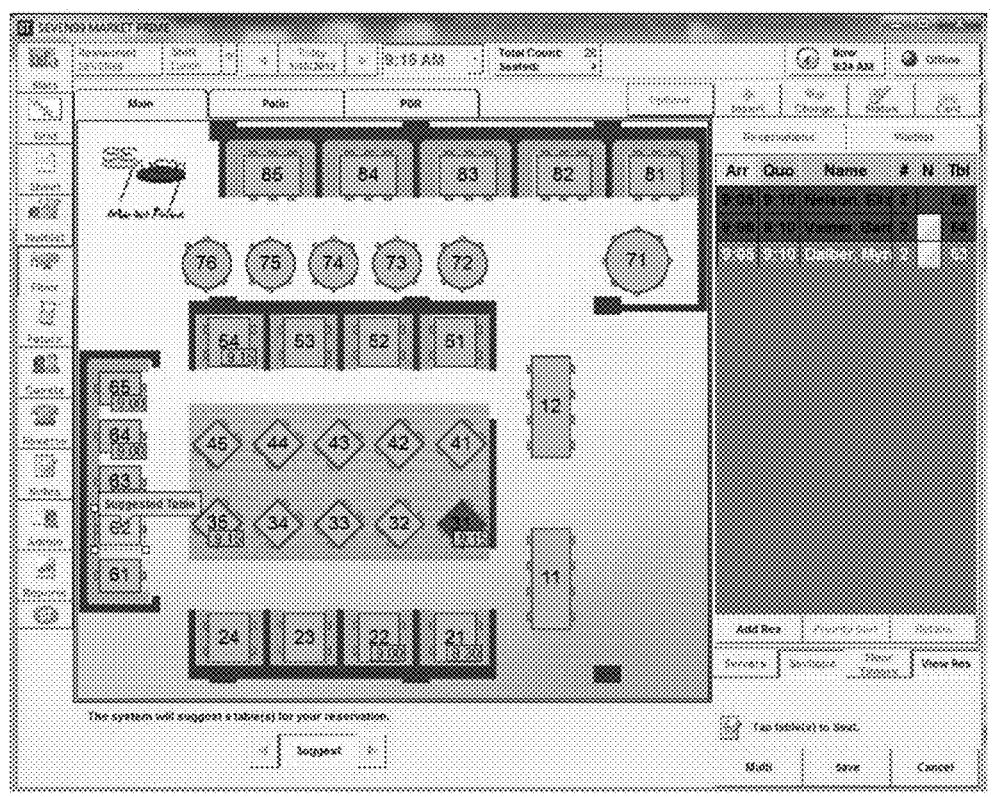
FIG. 27 is a block diagram illustrating an embodiment of a screen shot for suggesting a next table for walk-ins.

FIG. 27 is a block diagram illustrating an embodiment of a screen shot for suggesting a next table for walk-ins. In the example shown, once a walk-in guest is added, the system suggests a table based on an availability algorithm. If the user chooses, the user can ask the system to offer other suggestions. The system also offers table combinations.

Figure 28:
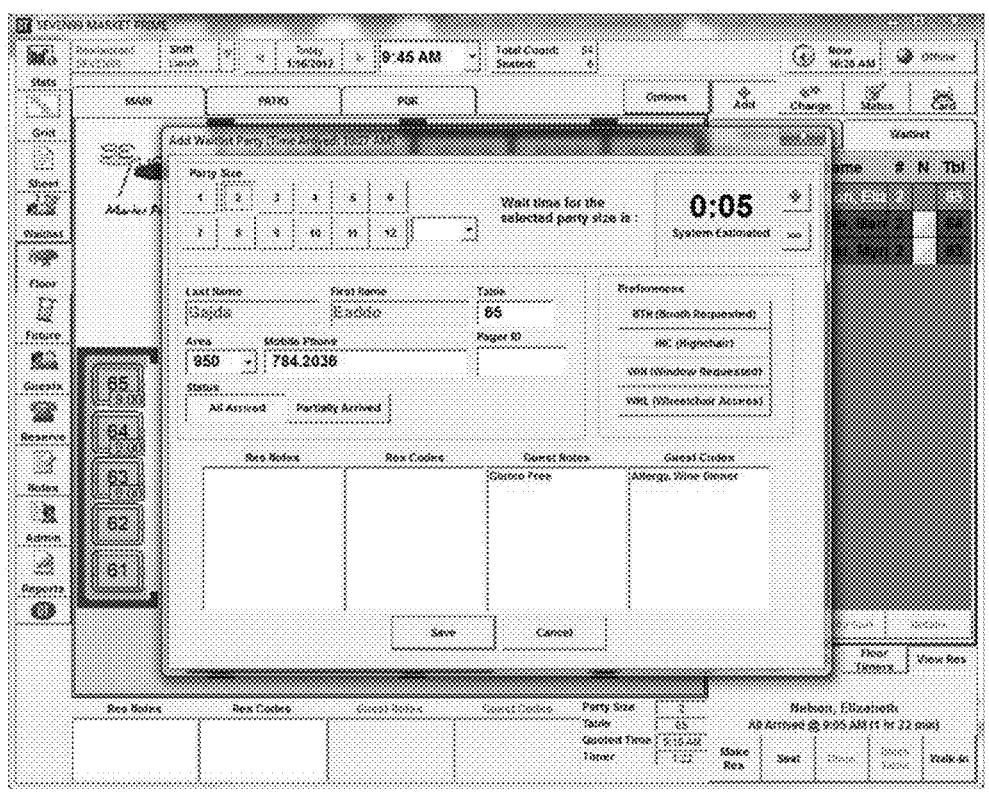
FIG. 28 is a block diagram illustrating an embodiment of a screen shot for adding to a waitlist.

FIG. 28 is a block diagram illustrating an embodiment of a screen shot for adding to a waitlist. In the example shown, the screen enables adding a wait list guest by selecting the party size and entering the guest information. The user is enabled to select preferences from a pre-populated list. The system estimated time is based on an availability algorithm. A user is enabled to have the option to add or subtract time from the wait. The system remembers if the wait time is adjusted.

Figure 29:
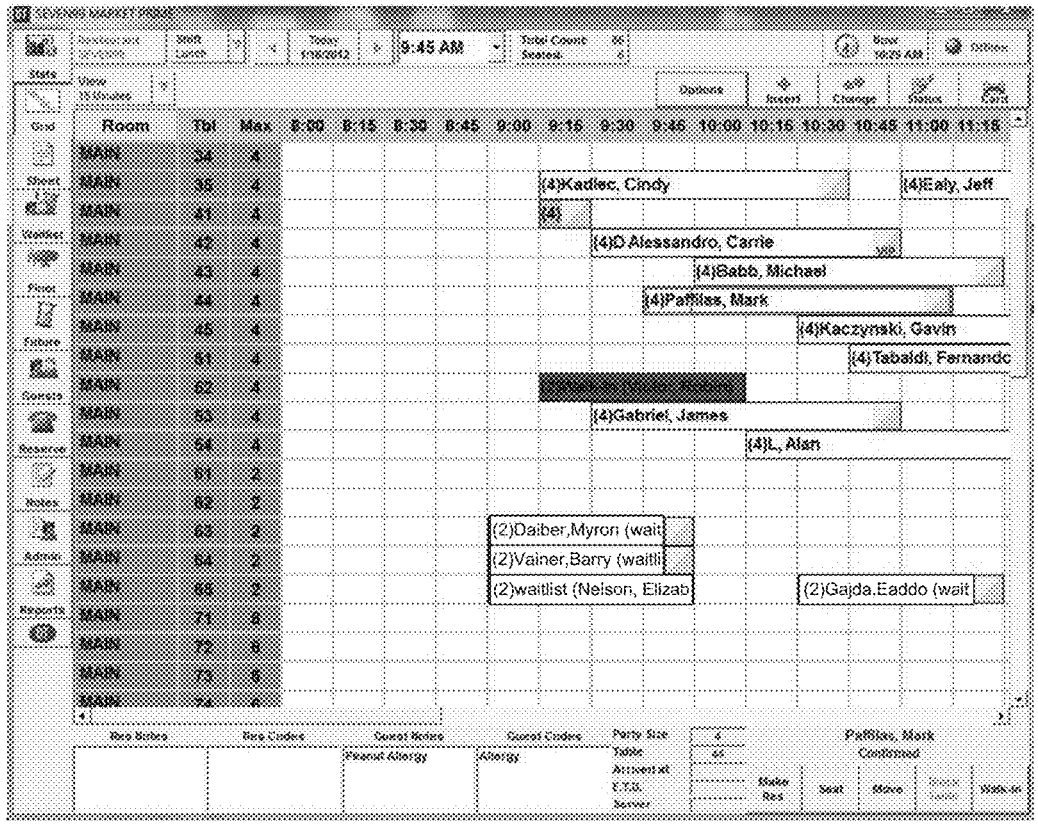
FIG. 29 is a block diagram illustrating an embodiment of a screen shot for viewing waitlisted guests.

FIG. 29 is a block diagram illustrating an embodiment of a screen shot for viewing waitlisted guests. In the example shown, waitlist guests appear in the grid and are marked as 'waitlist.' Waitlist guests are decremented from the restaurant's overall inventory.

Figure 30:
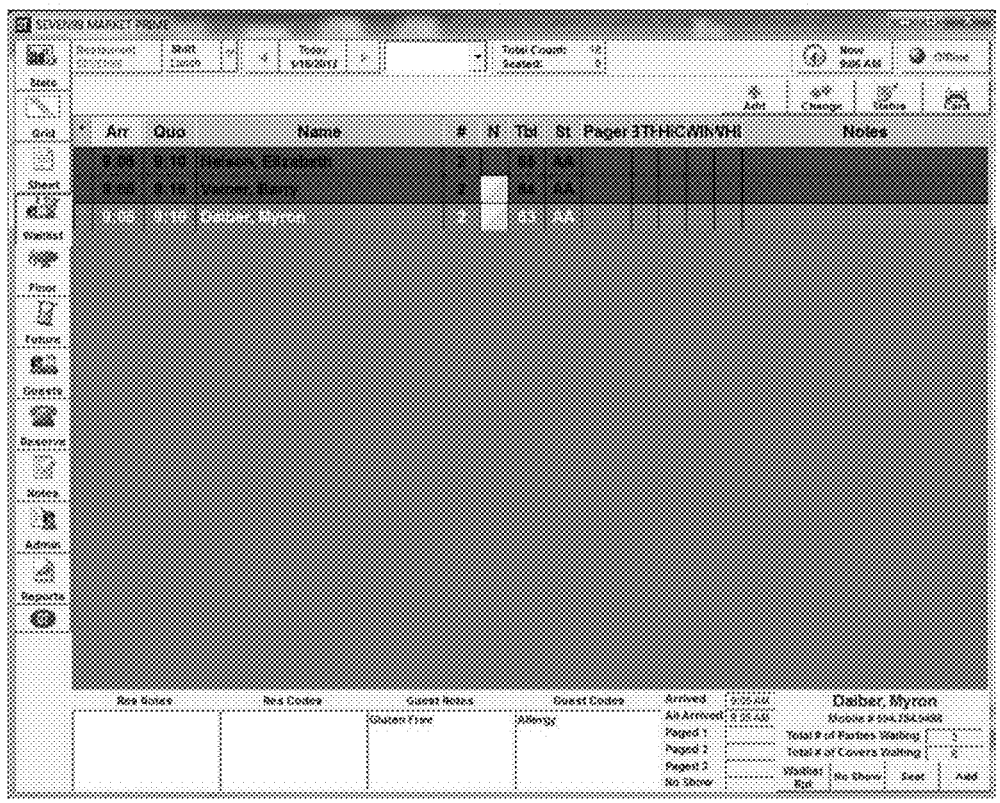
FIG. 30 is a block diagram illustrating an embodiment of a screen shot for adding to a waitlist in a detailed view.

FIG. 30 is a block diagram illustrating an embodiment of a screen shot for adding to a waitlist in a detailed view. In the example shown, the detailed waitlist view allows the user to view more information about waitlist parties in a single list (e.g., pager number).

Figure 31:
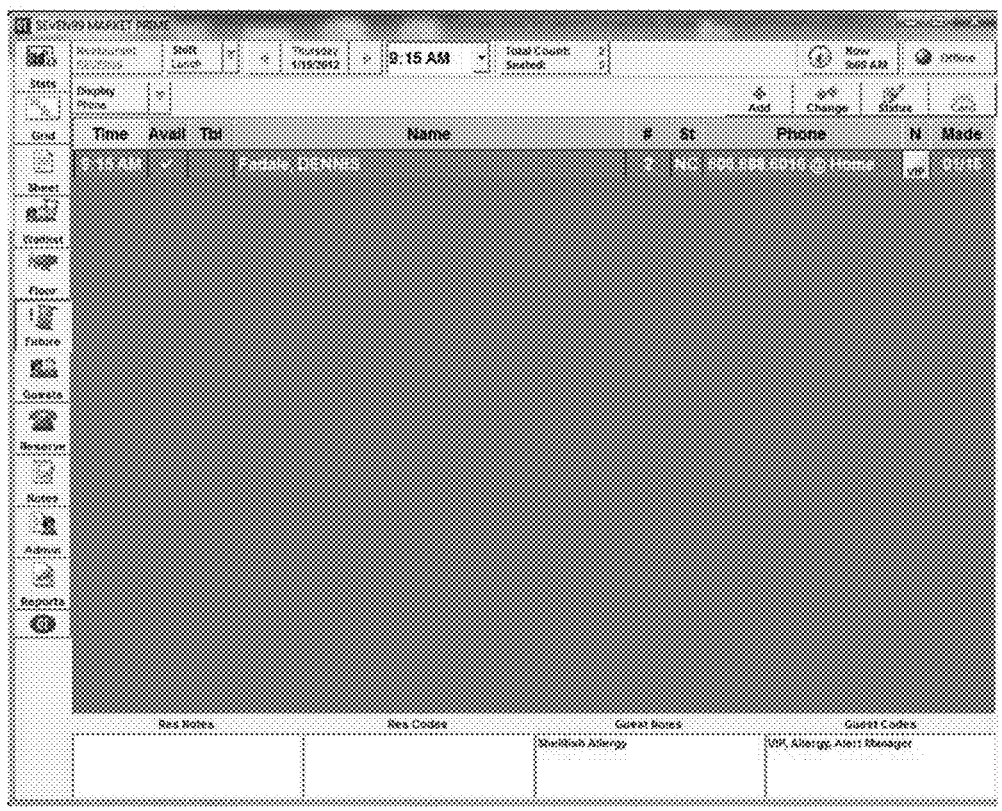
FIG. 31 is a block diagram illustrating an embodiment of a screen shot for a future waitlist.

FIG. 31 is a block diagram illustrating an embodiment of a screen shot for a future waitlist. In the example shown, a user can add a guest to a 'future waitlist' if they do not currently have availability in the future. If the requested time and date becomes free, the user will see an indicator (e.g., a '!') on the future icon. A user will also view a check mark in the available column for that reservation.

Figure 32:
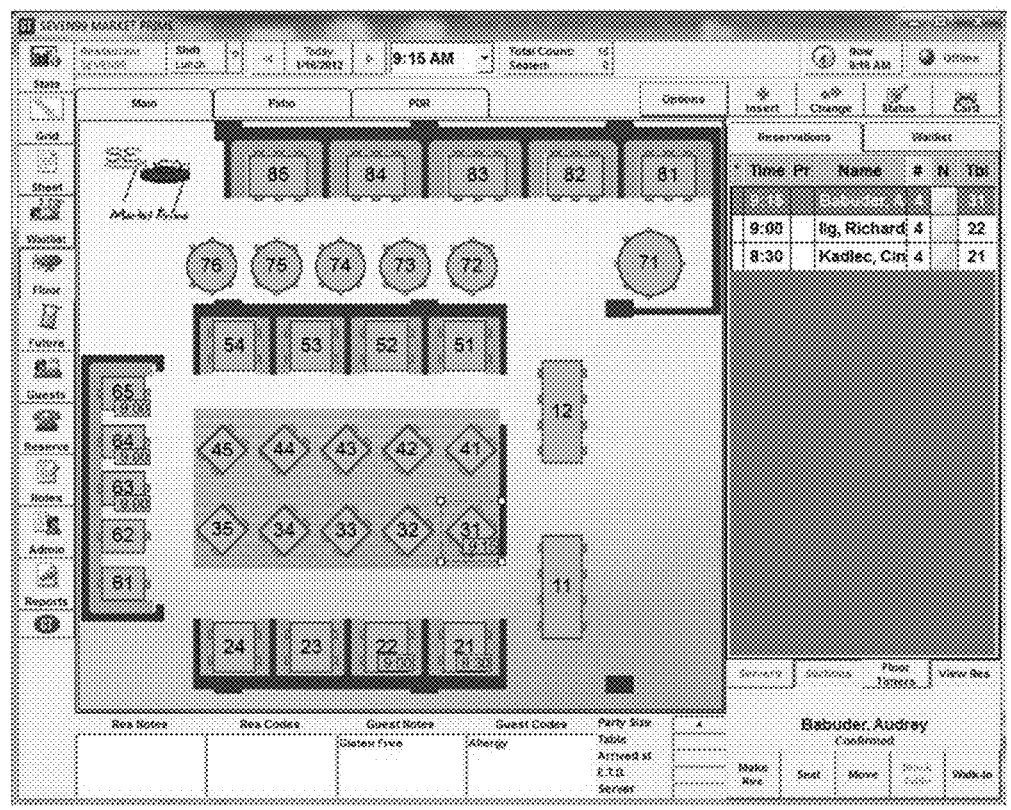
FIG. 32 is a block diagram illustrating an embodiment of a screen shot for a floor view.

FIG. 32 is a block diagram illustrating an embodiment of a screen shot for a floor view. In the example shown, a user is enabled to view different floor plans in the restaurant. Floor plans include bitmaps of the restaurant layout along with a representation of the restaurant's tables and chairs. A user is enabled to view upcoming reservations and guests on the waitlist. A user is enabled to make, move, and modify reservations. A user is enabled to indicate that a guest is seated or to change status for a guest. A user is enabled to add a walk-in guest. A user is enabled to block a table. A user is enabled to assign a server to a section.

Figure 33:
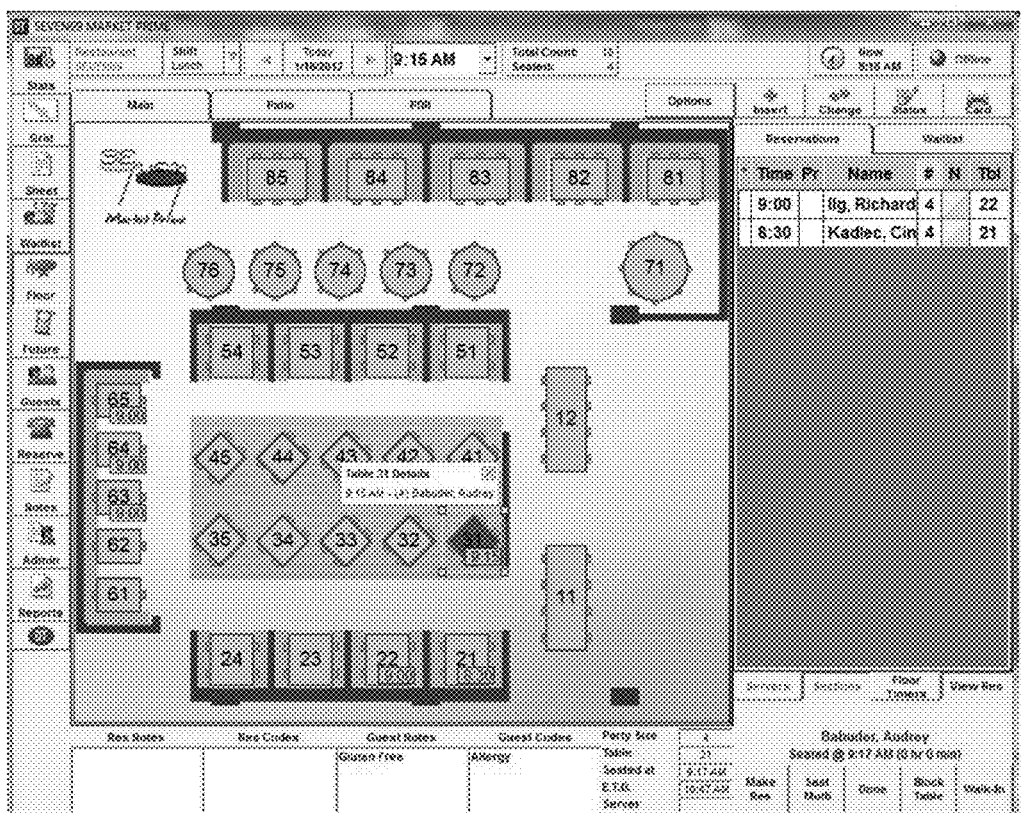
FIG. 33 is a block diagram illustrating an embodiment of a screen shot for seating guests.

FIG. 33 is a block diagram illustrating an embodiment of a screen shot for seating guests. In the example shown, a user is enabled to choose to have the system seat the guests in a pre-assigned table or another table of their choosing. Seated guests appear as a status color at the seated table. The user is enabled to view table details by clicking and holding on the table number.

Figure 34:
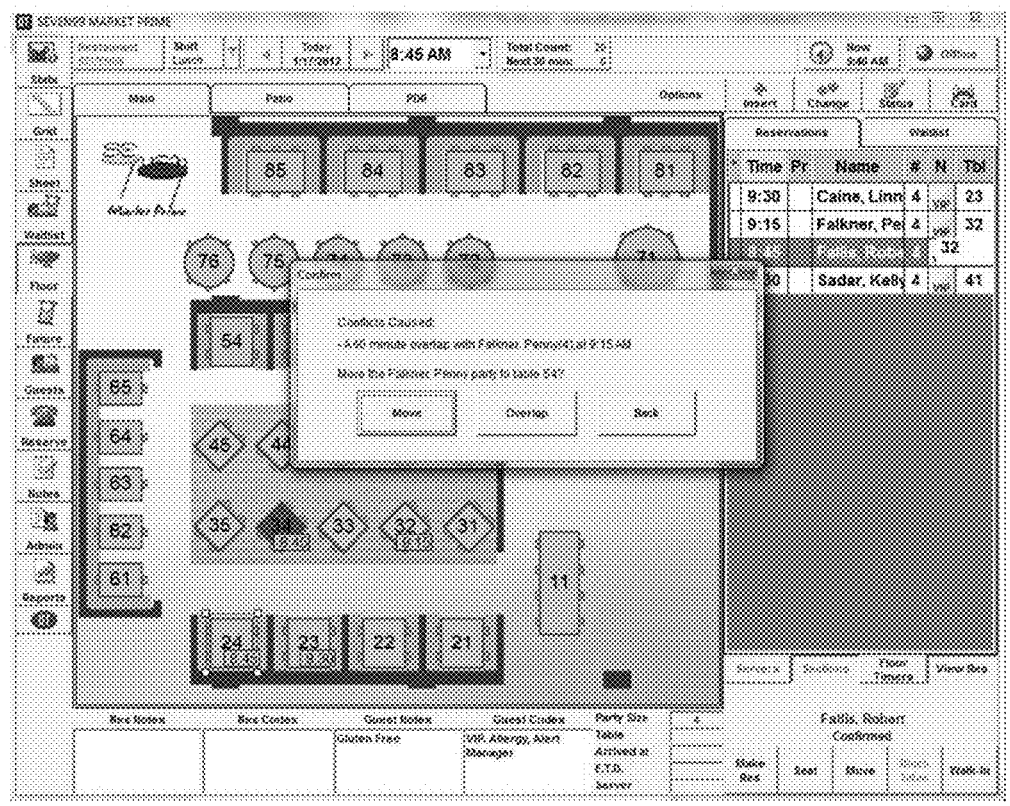
FIG. 34 is a block diagram illustrating an embodiment of a screen shot for handling conflict.

FIG. 34 is a block diagram illustrating an embodiment of a screen shot for handling conflict. In the example shown, the system provides the following conflict handling: over/underbooking the table's minimum and/or maximum party size range, overlapping with another reservation, exceeding the restaurant's pacing limits, overlapping with a manager or table block, overlapping with advanced seating blocks, booking outside of first and last seating times, and where possible, the system will attempt to move conflict reservations, or any other appropriate conflict handling.

Figure 35:
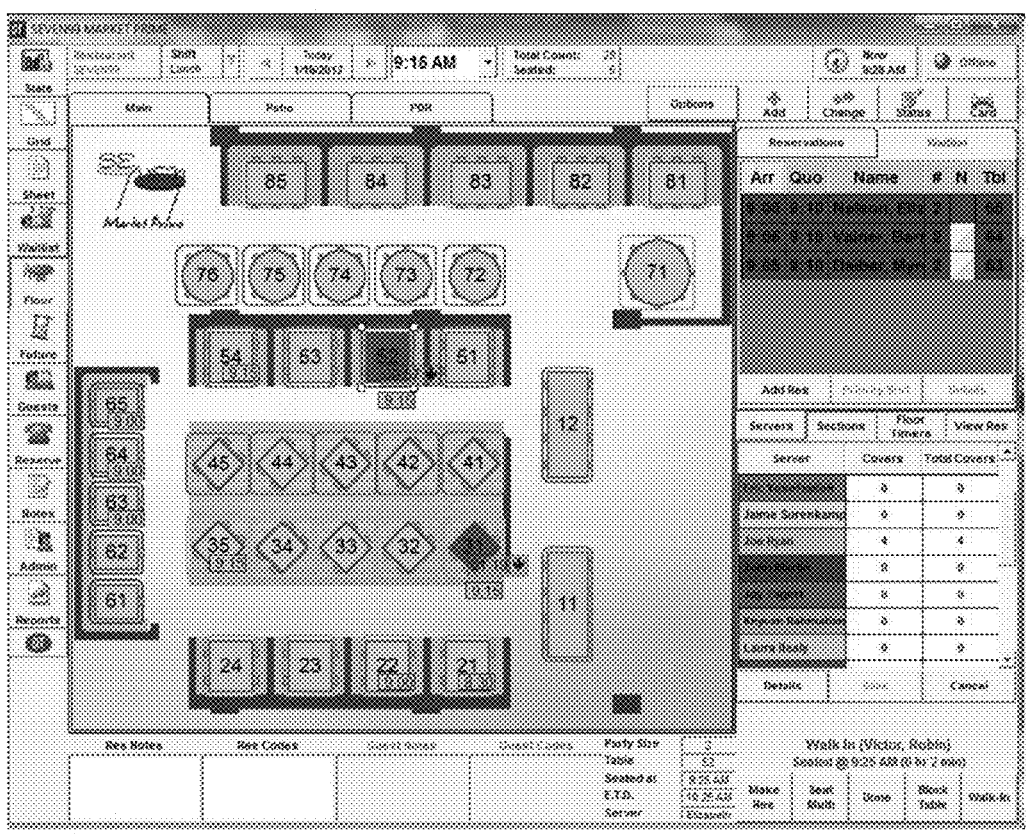
FIG. 35 is a block diagram illustrating an embodiment of a screen shot for viewing floor details.

FIG. 35 is a block diagram illustrating an embodiment of a screen shot for viewing floor details. In the example, shown, users are enabled to view: server and server counts, floor timers, reservations, server sections, or any other appropriate details.

Figure 36:
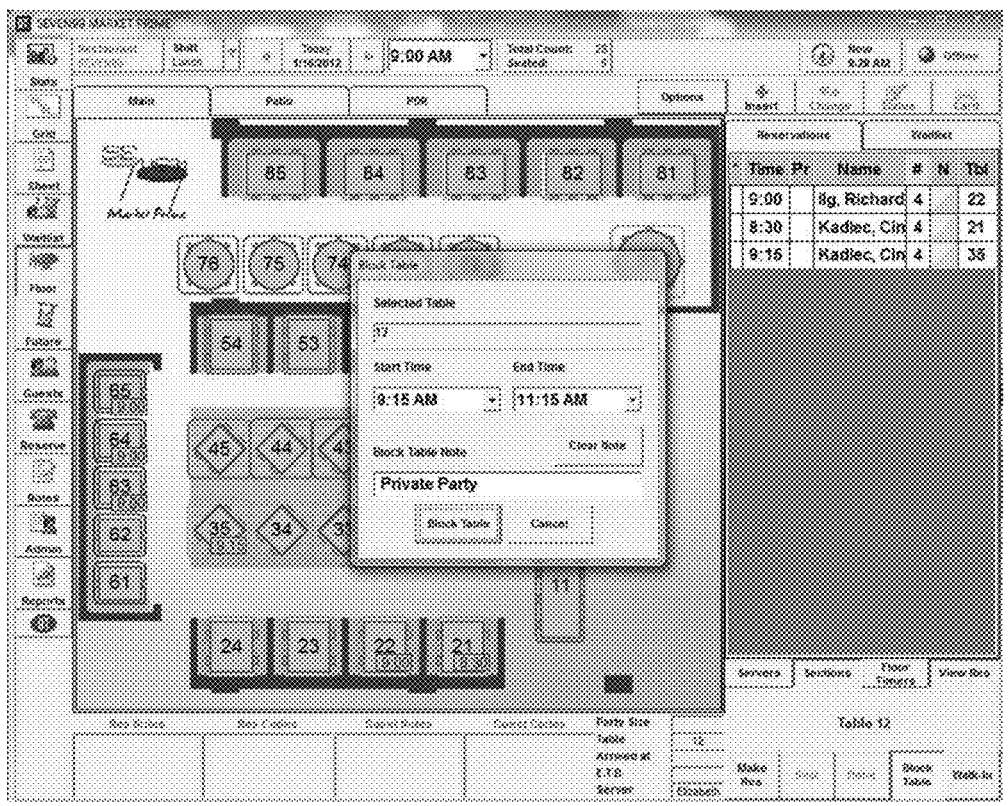
FIG. 36 is a block diagram illustrating an embodiment of a screen shot for blocking a table.

FIG. 36 is a block diagram illustrating an embodiment of a screen shot for blocking a table. In the example shown, a user is enabled to block tables from the floor view. Blocked tables can only be booked by users with the proper administration rights.

Figure 37:
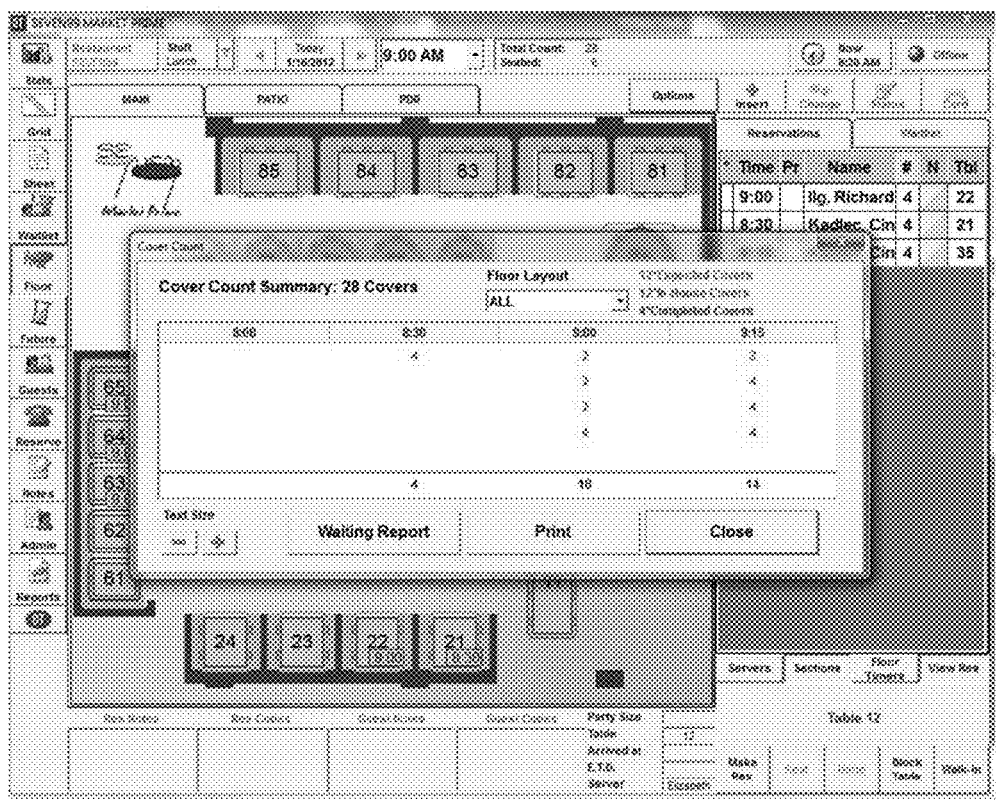
FIG. 37 is a block diagram illustrating an embodiment of a screen shot for viewing a cover count summary.

FIG. 37 is a block diagram illustrating an embodiment of a screen shot for viewing a cover count summary. In the example shown, a user is enabled to view a cover count summary. The cover count summary provides a breakout of current and expected covers in 15 minute increments.

Figure 38:
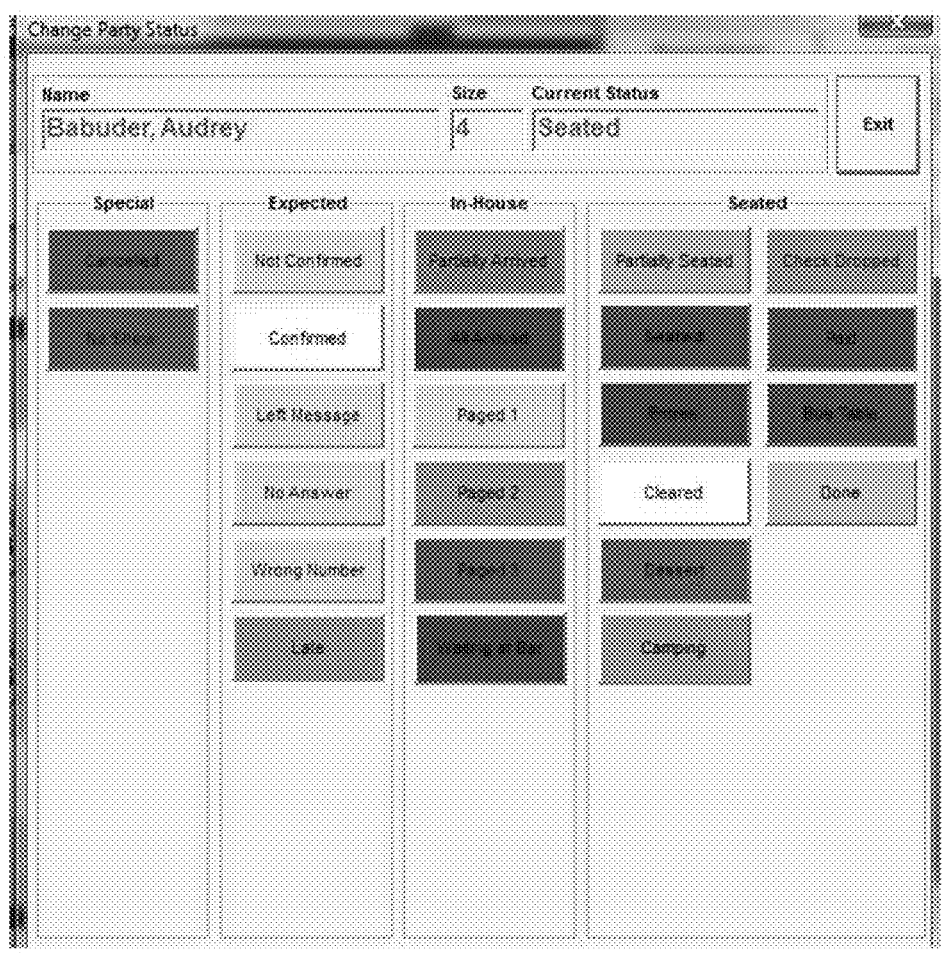
FIG. 38 is a block diagram illustrating an embodiment of a screen shot for viewing guest status.

FIG. 38 is a block diagram illustrating an embodiment of a screen shot for viewing guest status. In the example shown, a user is enabled to update the status of reservations in the book. The system will only allow legal status changes. For example, a party cannot go from 'expected' to 'done' without first going through a seating status (e.g., 'seated' or 'partially seated'). In some embodiments, the sequencing of colors associated with status (e.g., for a status button color) is determined to be allowable based on the a legal status change—for example, red cannot go to green—"cancelled," "no show," or "paged 3" to "check dropped." For another example, one set of colors to another set of colors (e.g., yellow—"not confirmed", "left message," "no answer," "wrong number," "page 1," or orange—"late," or "paged 2" to a blue "partially arrived" (pale blue), "partially seated" (light blue), "seated" (dark blue), or purple—"all arrived" "waiting at the bar" "entrée", etc.). In another example, sets of colors are sequenced—first set, second set, etc. where each set has one or more colors (e.g., associated with status buttons) and then allowable sequences of these colors have to progress or stay in the same set but not go backwards (e.g., second set, second set, third set, . . . ).

Figure 39:
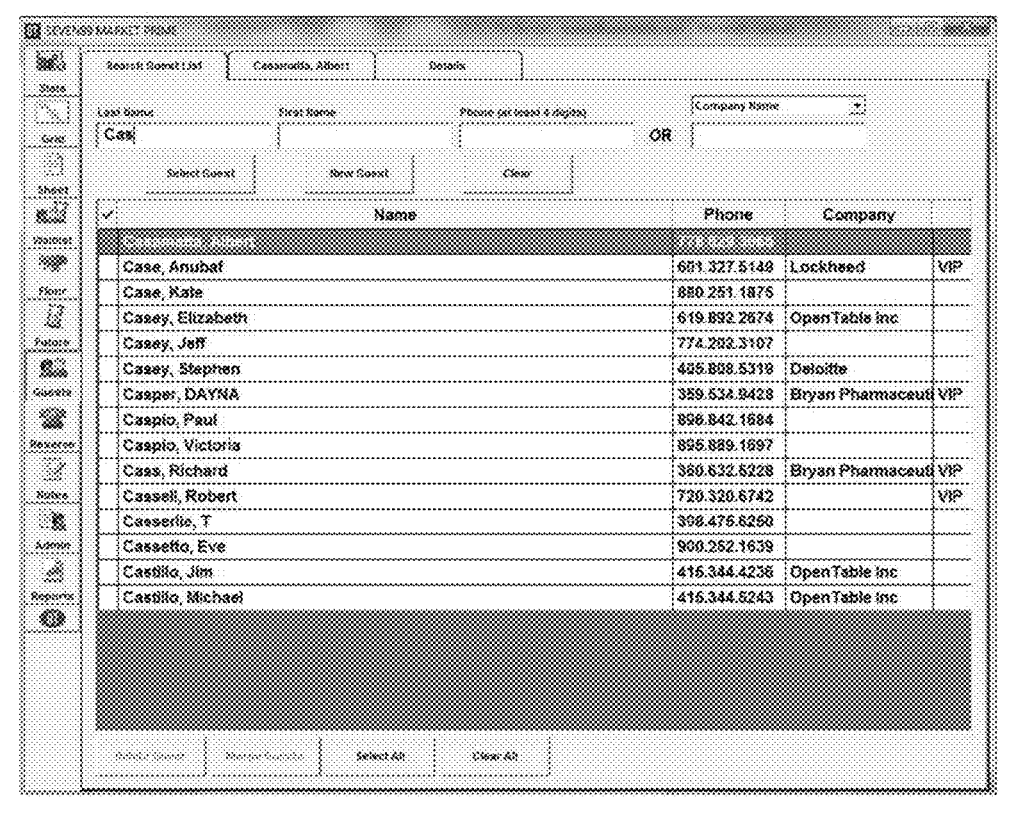

FIG. 39 is a block diagram illustrating an embodiment of a screen shot for searching guests. In the example shown, a user is enabled to search for a guest in a database. For example, a guest is searchable by: last name, first name, phone number, email address, company name, member identifier (ID), loyalty ID, administrator assistant's name, administrator assistant's email, or any other appropriate search criterion.

Figure 40:
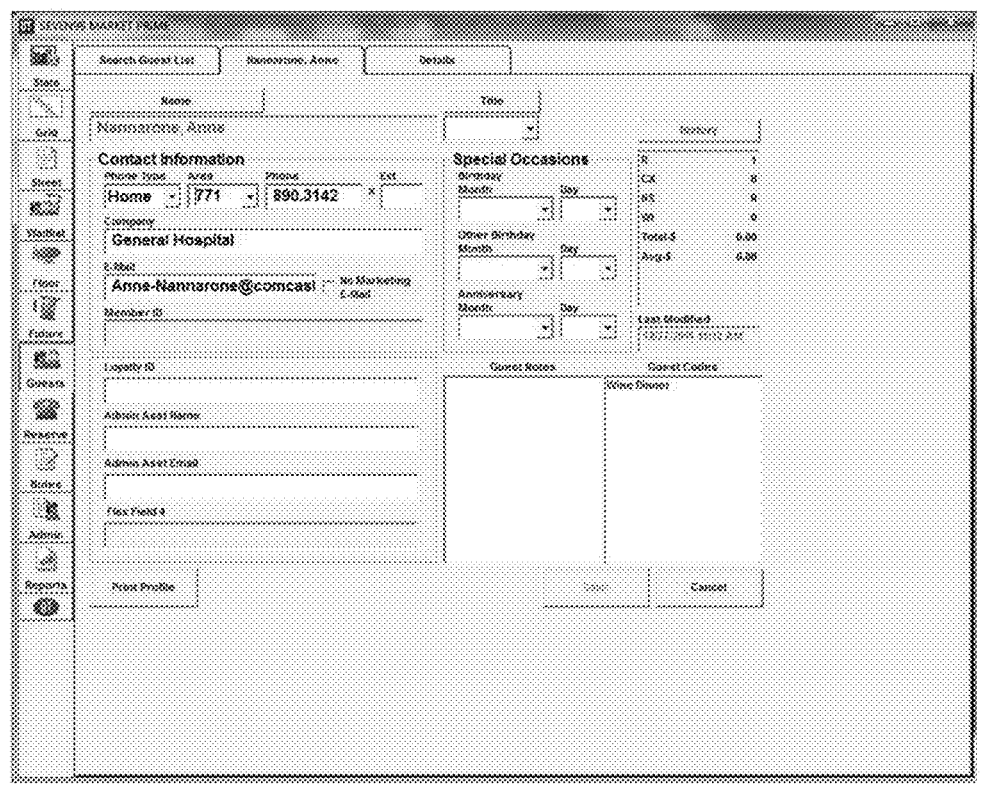
FIG. 40 is a block diagram illustrating an embodiment of a screen shot for viewing a guest.

FIG. 40 is a block diagram illustrating an embodiment of a screen shot for viewing a guest. In the example shown, a user is enabled to add guests to a database. A user is enabled to search for an existing guest or add a new guest. A user is also enabled to view a history summary and a complete history of the guest.

Figure 41:
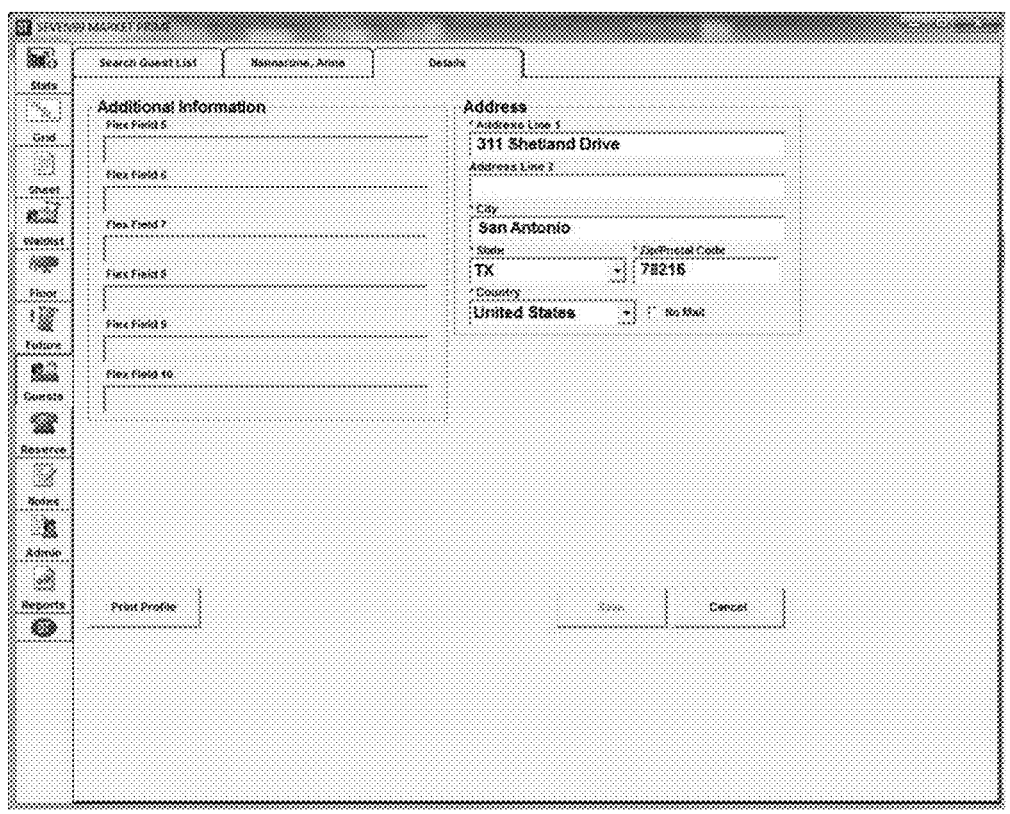
FIG. 41 is a block diagram illustrating an embodiment of a screen shot for viewing guest details.

FIG. 41 is a block diagram illustrating an embodiment of a screen shot for viewing guest details. In the example shown, a user is enabled to add and view additional information about the guest in the Flex Field boxes. Flex fields can be labeled in the administration section of the system.

Figure 42:
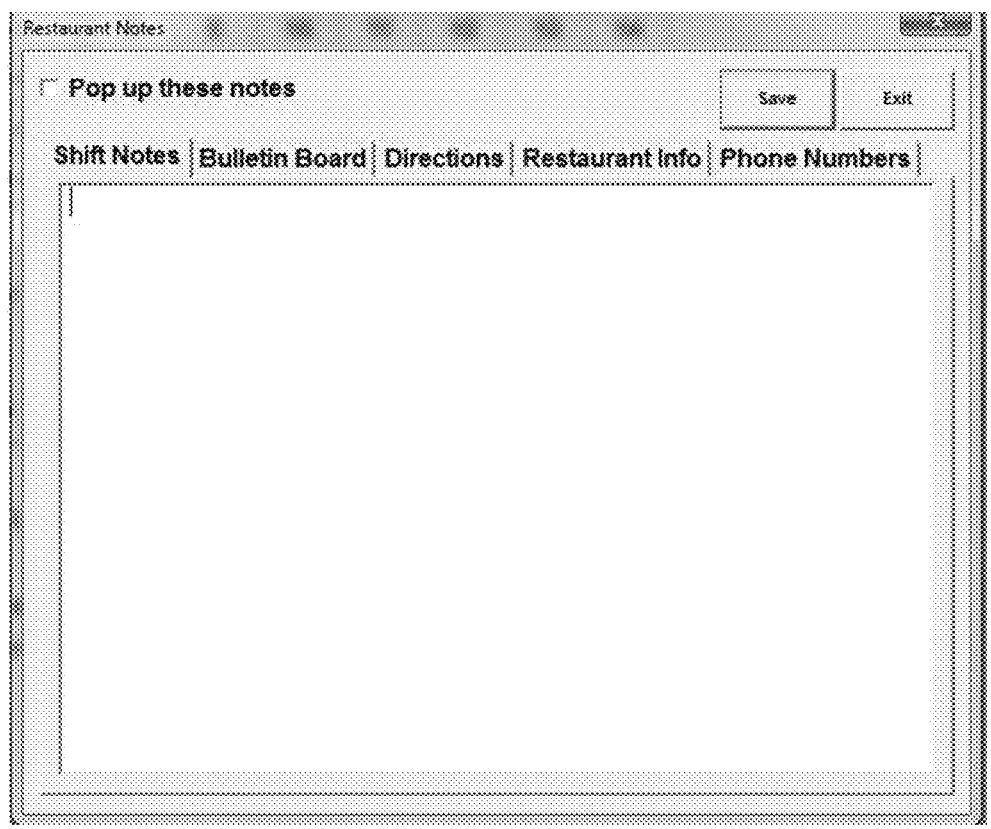
FIG. 42 is a block diagram illustrating an embodiment of a screen shot for restaurant notes.

FIG. 42 is a block diagram illustrating an embodiment of a screen shot for restaurant notes. In the example shown, a user is enabled to add additional notes that are viewable by other users of the system. A user is enabled to configure the notes to pop up. Examples are at the beginning of the application, every time a user navigates to a specific shift, every time a user navigates to a specific date, or any other place in the application.

Figure 43:
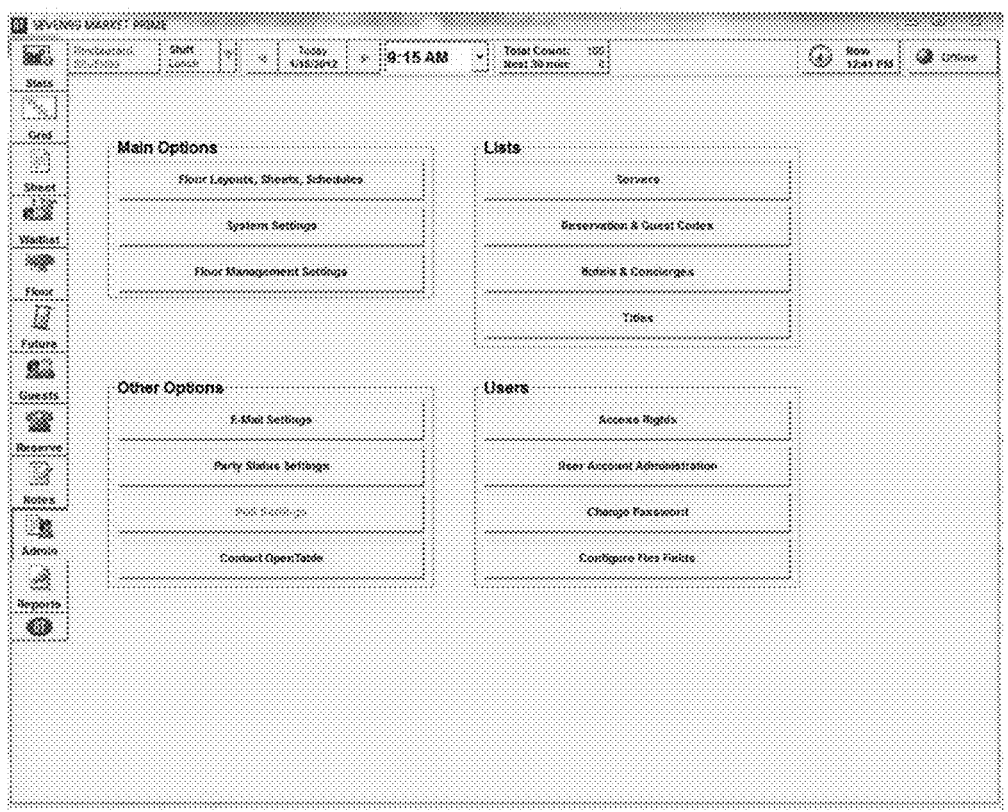
FIG. 43 is a block diagram illustrating an embodiment of a screen shot for administration.

FIG. 43 is a block diagram illustrating an embodiment of a screen shot for administration. In the example shown, a user is enabled to configure the settings for their electronic reservation book. A user is enabled to create, change, delete, and copy reservation sheets and floor layouts. A user is enabled to set schedules to open and close shifts and days and assign reservation sheets to open sheets. A user is enabled to edit system settings. For example, a user is enabled to edit a restaurant address, a restaurant telephone information, general settings, reservation settings, alert settings, or any other system settings. A user is enabled to edit floor management settings. For example, a user is enabled to set floor settings, seat option settings, waitlist settings, chit/guest card settings, or any other floor management settings. A user is also enabled to set up and manage access rights, create custom flex fields, create custom party status settings, or any other appropriate system parameters.

Figure 44:
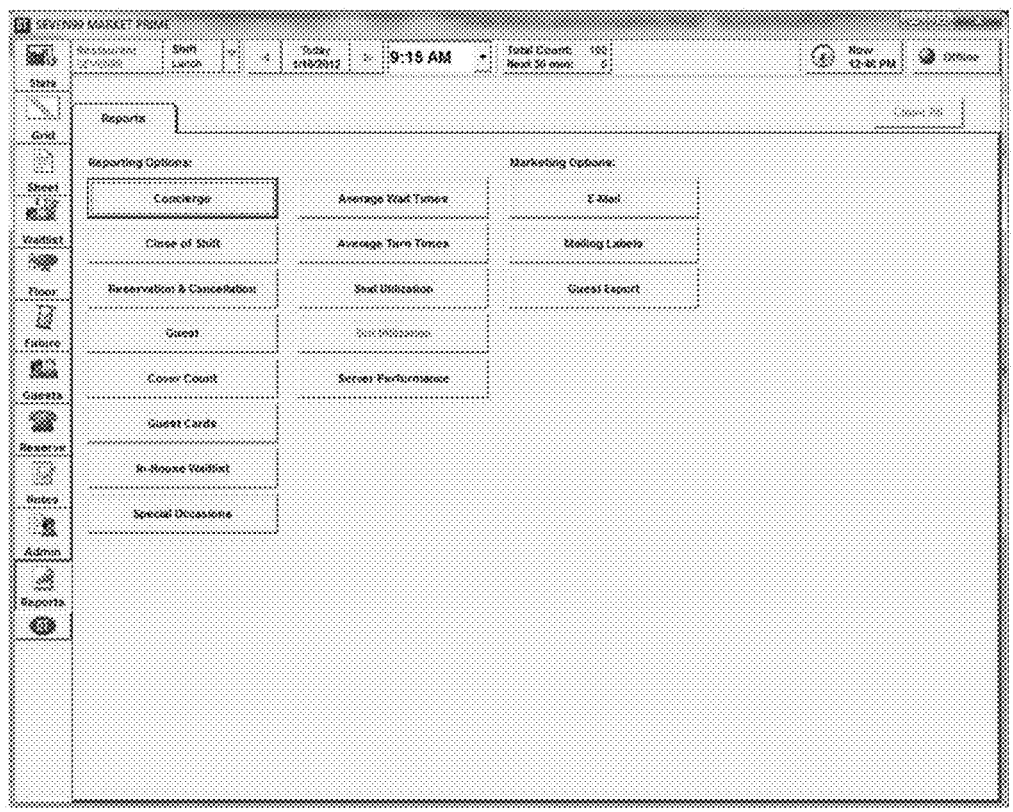
FIG. 44 is a block diagram illustrating an embodiment of a screen shot for reports.

FIG. 44 is a block diagram illustrating an embodiment of a screen shot for reports. In the example shown, a user is enabled to run a number of preconfigured reports (e.g., concierge, end of shift, reservation & cancellation, guest, cover count, guest cards, in-house waitlist, special occasions, average wait times, average turn times, seat utilization, slot utilization, server performance, or any other appropriate reports). A user is also enabled to create and send marketing emails. A user is also enabled to export all guest information (e.g., to a tab delimited file). A user is enabled to generate mailing labels.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for managing a restaurant, comprising:
   a restaurant server, wherein the restaurant server comprises:
      a graphical user interface, wherein the graphical user interface comprises:
         a display, wherein the display displays reservation information for the restaurant, wherein the reservation information includes a colored indicator of a status and a duration the status has been maintained, wherein the colored indicator of the status and the duration the status has been maintained are changed to a next status by selecting a status button on the graphical user interface, wherein the next status is associated with a next state in a sequence of states that the status button cycles through, wherein the sequence of states comprises at least four states; and
      an input interface, wherein the input interface receives an indication to display the reservation information for the restaurant, wherein the reservation information includes waiting list information, the waiting list information including a wait list entry, the wait list entry including a desired table, wherein the input interface further:
         receives a selection of the status button which changes: the status to the next status, the colored indicator of the status to a colored indicator of the next status, and the duration the status has been maintained to the duration the next status has been maintained;
         receives a selection of a multiple table button which changes a table suggestion interface to a multiple table suggestion interface, the multiple table suggestion interface including a list of multiple table combinations and a next multiple table suggestion button, the list of multiple table combinations including an available multiple table suggestion, the next multiple table suggestion button providing another multiple table suggestion from the list of multiple table combinations, the multiple table suggestion indicating a plurality of adjacent available tables for a single party, wherein the other multiple table suggestion is determined based on leaving the largest possible number of combinations of tables available, maximizing availability, maximizing turnover, maximizing utilization of a server, maximizing utilization of a view area, maximizing utilization of a window area, minimizing wait time, or any combination thereof;
         determines whether a change to a reservation or a seated party affects at least one wait list entry of the waiting list information; and in response a determination that the change to the reservation or the seated party affects the at least one wait list entry of the waiting list information, causes a reassignment of an unseated party to optimize table usage, increase yield, or a combination thereof.

2. A system as in claim 1, wherein the colored indicator of the status comprises a region of color on the wait list entry.

3. A system as in claim 1, wherein the colored indicator of the status comprises a region of color on a reservation list entry.

4. A system as in claim 1, wherein the colored indicator of the status comprises a region of color on a table map.

5. A system as in claim 1, wherein the colored indicator of the status comprises a region of texture on the wait list entry.

6. A system as in claim 1, wherein the colored indicator of the status comprises a region of texture on a reservation list entry.

7. A system as in claim 1, wherein the colored indicator of the status comprises a region of texture on a table map.

8. A system as in claim 1, wherein the status is further changed using a change status user interface window.

9. A system as in claim 8, wherein the change status user interface window includes a plurality of status buttons.

10. A system as in claim 1, wherein an arrangement of a button associated with the status and a corresponding state it represents is configurable and extensible.

11. A system as in claim 10, wherein the corresponding state indicates one of the following: cancelled, no show, not confirmed, confirmed, left message, no answer, wrong number, or late.

12. A system as in claim 10, wherein the corresponding state indicates one of the following: partially arrived, all arrived, paged, partially seated, or seated.

13. A system as in claim 10, wherein the corresponding state indicates one of the following: entree, cleared, appetizer, check dropped, cleared, dessert, menus dropped, paid, bus table, or done.

14. A system as in claim 1, wherein the status button is located on a graphical user interface comprising a display of a map of tables in the restaurant.

15. A system as in claim 1, wherein the indication further comprises one or more of the following: an indication to start or turn on a reservation system, an indication to view reservation information, an indication to view table information, an indication to view server information, or an indication to view guest information.

16. A method for managing a restaurant, comprising:
receiving an indication to view reservation information for a restaurant, wherein the reservation information includes waiting list information, the waiting list information including a wait list entry, the wait list entry including a desired table, wherein the receiving uses a graphical user interface of a restaurant server comprising a display and an input interface;
displaying the reservation information for the restaurant, wherein displaying uses the graphical user interface, wherein the reservation information includes a colored indicator of a status and a duration the status has been maintained, wherein the colored indicator of the status and the duration the status has been maintained are changed to a next status by selecting a status button on the graphical user interface, wherein the next status is associated with a next state in a sequence of states that the status button cycles through, wherein the sequence of states comprises at least four states;
receiving a selection, through the input interface, of the status button which changes: the status to the next status, the colored indicator of the status to a colored indicator of the next status, and the duration the status has been maintained to the duration the next status has been maintained;
receiving a selection, through the input interface, of a multiple table button which changes a table suggestion interface to a multiple table suggestion interface, the multiple table suggestion interface including a list of multiple table combinations and a next multiple table suggestion button, the list of multiple table combinations including an available multiple table suggestion, the next multiple table suggestion button providing another multiple table suggestion from the list of multiple table combinations, the multiple table suggestion indicating a plurality of adjacent available tables for a single party, wherein the other multiple table suggestion is determined based on leaving the largest possible number of combinations of tables available, maximizing availability, maximizing turnover, maximizing utilization of a server, maximizing utilization of a view area, maximizing utilization of a window area, minimizing wait time, or any combination thereof;
determining whether a change to a reservation or a seated party affects at least one wait list entry of the waiting list information; and
in response a determination that the change to the reservation or the seated party affects the at least one wait list entry of the waiting list information, causing a reassignment of an unseated party to optimize table usage, increase yield, or a combination thereof.

17. A computer program product for managing a restaurant, the computer program product being embodied in a tangible computer readable storage medium and comprising computer instructions for:
receiving an indication to view reservation information for a restaurant, wherein the reservation information includes waiting list information, the waiting list information including a wait list entry, the wait list entry including a desired table, wherein the receiving uses a graphical user interface of a restaurant server comprising a display and an input interface;
displaying the reservation information for the restaurant, wherein displaying uses the graphical user interface, wherein the reservation information includes a colored indicator of a status and a duration the status has been maintained, wherein the colored indicator of the status and the duration the status has been maintained are changed to a next status by selecting a status button on the graphical user interface, wherein the next status is associated with a next state in a sequence of states that the status button cycles through, wherein the sequence of states comprises at least four states;
receiving a selection, through the input interface, of the status button which changes: the status to the next status, the colored indicator of the status to a colored indicator of the next status, and the duration the status has been maintained to the duration the next status has been maintained;
receiving, through the input interface, a selection of a multiple table button which changes a table suggestion interface to a multiple table suggestion interface, the multiple table suggestion interface including a list of multiple table combinations and a next multiple table suggestion button, the list of multiple table combinations including an available multiple table suggestion, the next multiple table suggestion button providing another multiple table suggestion from the list of multiple table combinations, the multiple table suggestion indicating a plurality of adjacent available tables for a single party, wherein the other multiple table suggestion is determined based on leaving the largest possible number of combinations of tables available, maximizing availability, maximizing turnover, maximizing utilization of a server, maximizing utilization of a view area, maximizing utilization of a window area, minimizing wait time, or any combination thereof;

determining whether a change to a reservation or a seated party affects at least one wait list entry of the waiting list information; and in response a determination that the change to the reservation or the seated party affects the at least one wait list entry of the waiting list information, causing a reassignment of an unseated party to optimize table usage, increase yield, or a combination thereof.

18. A system as in claim 1, wherein the sequence of states is specified for the status button.

19. A system as in claim 1, wherein the at least the four states indicate: seated, ordered, paid, then bus table.

20. A system as in claim 1, wherein the reservation information comprises a floor timer, wherein the floor timer is used for timing a duration a party has been seated or has maintained a current status.

21. A system as in claim 1, wherein the graphic user interface comprises another display of a plurality of status buttons, wherein the plurality of status buttons is configurable in arrangement on the graphical user interface and in which status category and in content of a status button.

22. A system as in claim 14, wherein the display of a map of tables further comprises a list of reservations next to the map of tables on the same screen, wherein the list of reservations comprises the reservation information.

23. A system as in claim 22, wherein the list of reservations comprises a region with the colored indicator of the status of each reservation.

24. The system as in claim 1, wherein based on the status button being selected via the input interface, a status associated with a reservation included in the reservation information is cycled to a next permissible status.

25. The system as in claim 24, wherein at least one permissible sequence is defined so as to define the next permissible status in relation to a current status of the reservation.

26. A system as in claim 1, wherein the input interface receives an indication to suggest a table for other reservations and, based on the desired table being known, the suggested table calculated for the other reservations is made to avoid seating at the desired table, to reduce a possibility of seating at the desired table, or a combination thereof.

* * * * *